US012639988B2

(12) United States Patent
Smith et al.

(10) Patent No.: US 12,639,988 B2
(45) Date of Patent: May 26, 2026

(54) SCALABLE DIGITAL TWIN SERVICES FOR INTELLIGENT TRANSPORT SYSTEMS (ITS) WITH OPTIMIZED COMMUNICATION AND DYNAMIC RESOURCE ADAPTATION

(71) Applicant: Intel Corporation, Santa Clara, CA (US)

(72) Inventors: Ned M. Smith, Beaverton, OR (US); S M Iftekharul Alam, Hillsboro, OR (US); Ignacio J. Alvarez, Portland, OR (US); Kshitij Doshi, Tempe, AZ (US); Francesc Guim Bernat, Barcelona (ES); Satish Jha, Portland, OR (US); Arvind Merwaday, Hillsboro, OR (US); Vesh Raj Sharma Banjade, Portland, OR (US); Kathiravetpillai Sivanesan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/936,438

(22) Filed: Sep. 29, 2022

(65) Prior Publication Data

US 2024/0112506 A1     Apr. 4, 2024

(51) Int. Cl.
| | |
|---|---|
| *G07C 5/00* | (2006.01) |
| *H04W 74/00* | (2009.01) |

(52) U.S. Cl.
CPC .......... *G07C 5/008* (2013.01); *H04W 74/002* (2013.01)

(58) Field of Classification Search
CPC ............................. H04W 74/002; H04L 12/28
USPC ......................... 370/329, 401, 402, 403, 405
See application file for complete search history.

(56) References Cited

U.S. PATENT DOCUMENTS

| | | | |
|---|---|---|---|
| 2016/0057014 A1* | 2/2016 | Thakkar | H04L 41/0813 |
| | | | 709/223 |
| 2022/0200993 A1* | 6/2022 | Smith | H04L 63/20 |

OTHER PUBLICATIONS

WillowTwin Product, found at https://www.willowinc.com; May 12, 2022.
The Providentia Project, found at https://innovation-mobility.com/en/project-providentia/; Apr. 21, 2021 via Wayback Machine Capture.

* cited by examiner

*Primary Examiner* — Dang T Ton
(74) *Attorney, Agent, or Firm* — Banner & Witcoff, Ltd.

(57) ABSTRACT

A DTaaS architecture is described to support communication-side optimization and to reduce communication overhead while meeting necessary reliability and latency requirements. The disclosure describe techniques for utilizing DT resources for V2X environments using both virtual and physical "twin" resources to achieve improved resiliency. Moreover, to optimize redundancy costs, the ratio of virtual DT nodes to physical DT nodes may be asymmetrical. An asymmetric approach to DT redundancies involving both virtual and physical resources enables greater flexibility in managing deployment costs.

20 Claims, 7 Drawing Sheets

600

Receive digital twin as a service (DTaaS) service
messages
602

Provide a data model of a V2X node that is accessed in
response to requests received via the DTaaS service
messages
604

Transmit network context information and/or situational
awareness information to a digital twin network
controller (DNC)
606

Receive instructions from the DNC with respect to
communication operations
608

400

Figure 5:
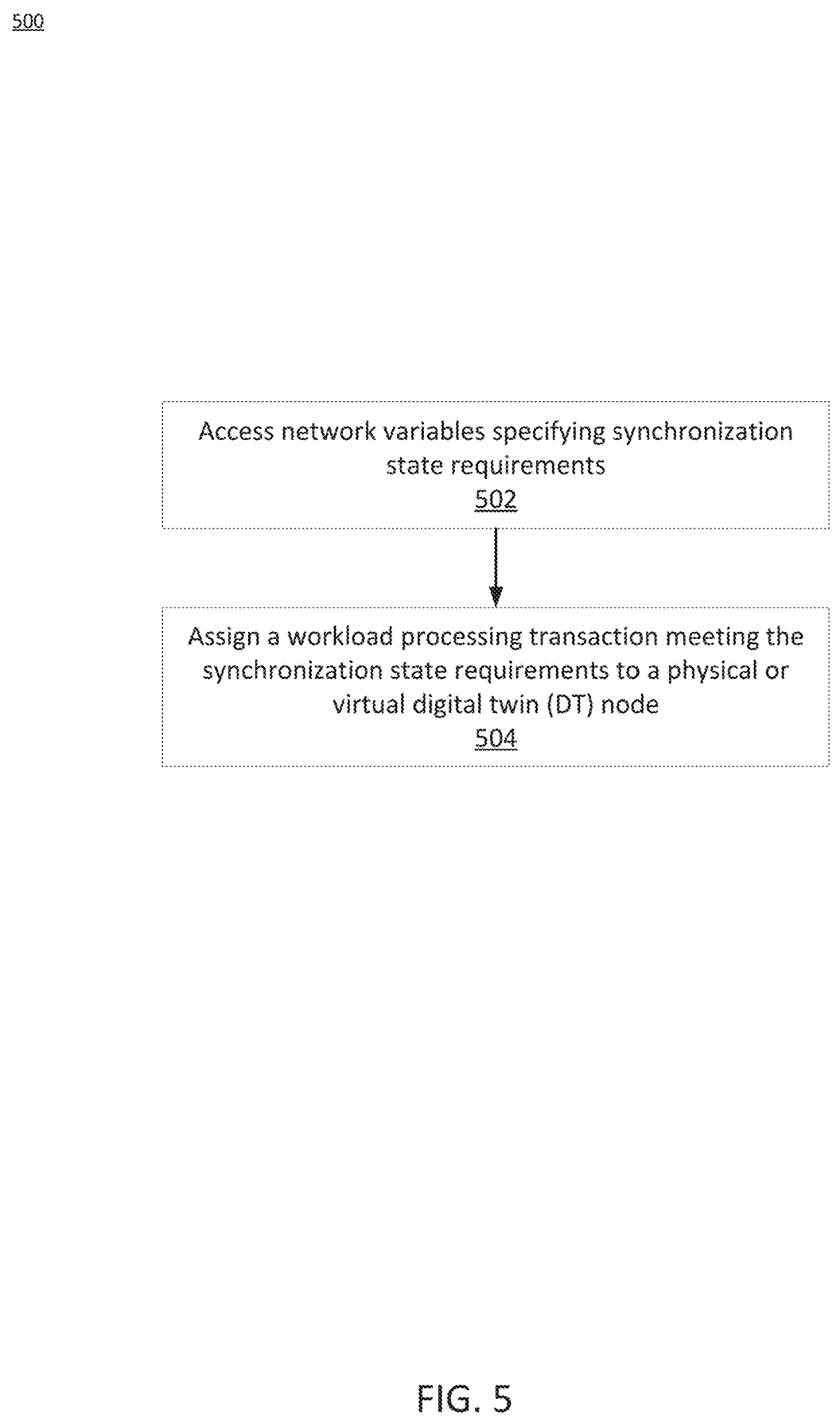

500

```
┌──────────────────────────────────────────────┐
│                                                │
│   Access network variables specifying          │
│   synchronization state requirements           │
│                    502                          │
│                                                │
└──────────────────────────────────────────────┘
                        │
                        ▼
┌──────────────────────────────────────────────┐
│                                                │
│   Assign a workload processing transaction     │
│   meeting the synchronization state            │
│   requirements to a physical or                │
│   virtual digital twin (DT) node               │
│                    504                          │
│                                                │
└──────────────────────────────────────────────┘
```

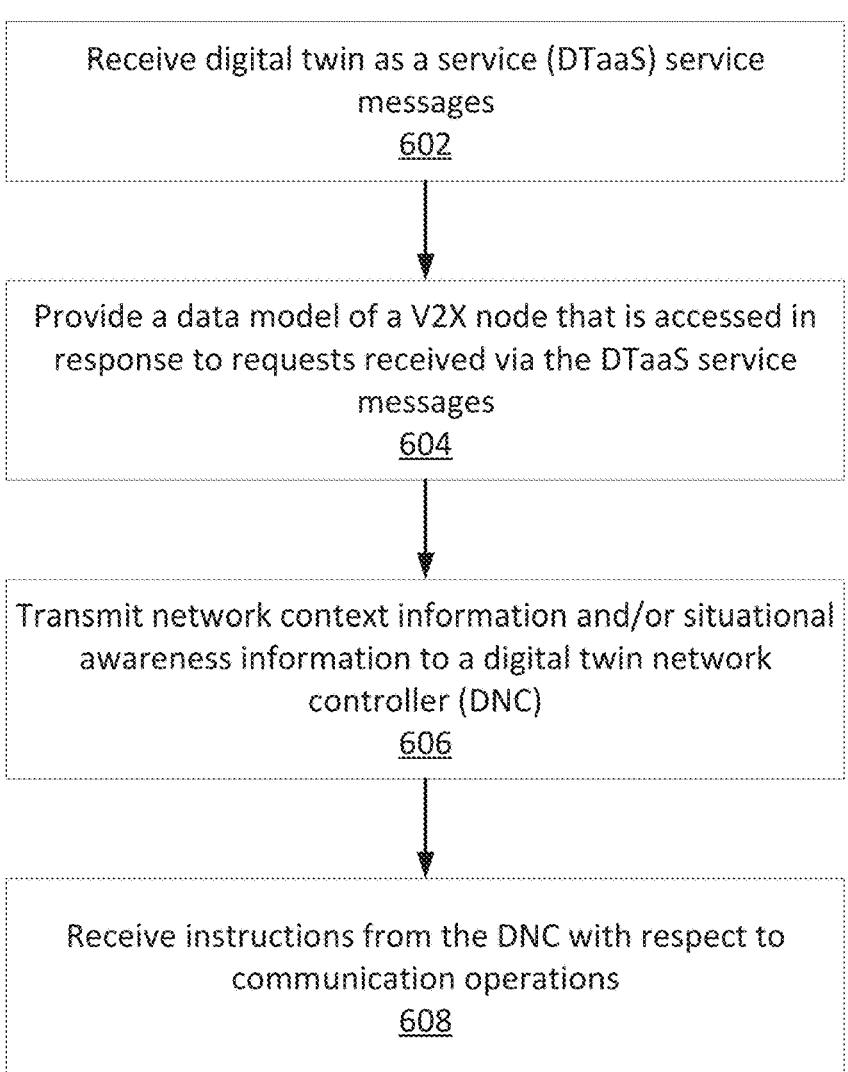

Receive digital twin as a service (DTaaS) service messages
602

Provide a data model of a V2X node that is accessed in response to requests received via the DTaaS service messages
604

Transmit network context information and/or situational awareness information to a digital twin network controller (DNC)
606

Receive instructions from the DNC with respect to communication operations
608

FIG. 6

SCALABLE DIGITAL TWIN SERVICES FOR INTELLIGENT TRANSPORT SYSTEMS (ITS) WITH OPTIMIZED COMMUNICATION AND DYNAMIC RESOURCE ADAPTATION

TECHNICAL FIELD

The disclosure described herein generally relates to the use of digital twin (DT) nodes and, more particularly, to techniques that implement DT clusters of physical, virtual, and vehicle-to-everything (V2X) nodes to apply DT concepts as part of an enhanced system architecture for V2X applications.

BACKGROUND

On-demand services at the V2X Edge create challenges involving orchestration, availability, and safety of real-world resources, which often requires frequent interactions between physical and virtual instantiations of V2X workloads. Edge digital twin (DT) techniques have shown availability and latency improvements for cloud and edge workloads by creating a virtual copy of workload data, context, and execution resources. However, applying DT techniques to V2X workloads is not straightforward. Instead, V2X workloads must coordinate closely with kinetic cyber-physical nodes. Kinesis in this context implies that virtual world resource optimization strategies can be invalidated by changes to the User Equipment (UE) location. Thus, V2X tenants (e.g. customer/user/subscriber/road-users/autonomous vehicles, etc.) may realize resiliency benefits from having both virtual and physical (i.e. redundant/standby physical V2X nodes) "twins." But employing physical DTs introduces new challenges to orchestration, congestion control, safety, and cost optimizations. Nevertheless, the potential benefits in reliability and resiliency may justify added costs, and digital twin as a service (DTaaS) provides a business context for monetizing value in V2X environments. In light of the complexity introduced with respect to the optimization strategies, current attempts for providing and monetizing DTaaS have been significantly hindered.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the implementations as discussed herein.

FIG. 5 illustrates a process flow, in accordance with the disclosure; and

FIG. 6 illustrates a process flow, in accordance with the disclosure.

The present disclosure will be described with reference to the accompanying drawings. The drawing in which an element first appears is typically indicated by the leftmost digit(s) in the corresponding reference number.

DETAILED DESCRIPTION

Figure 1:
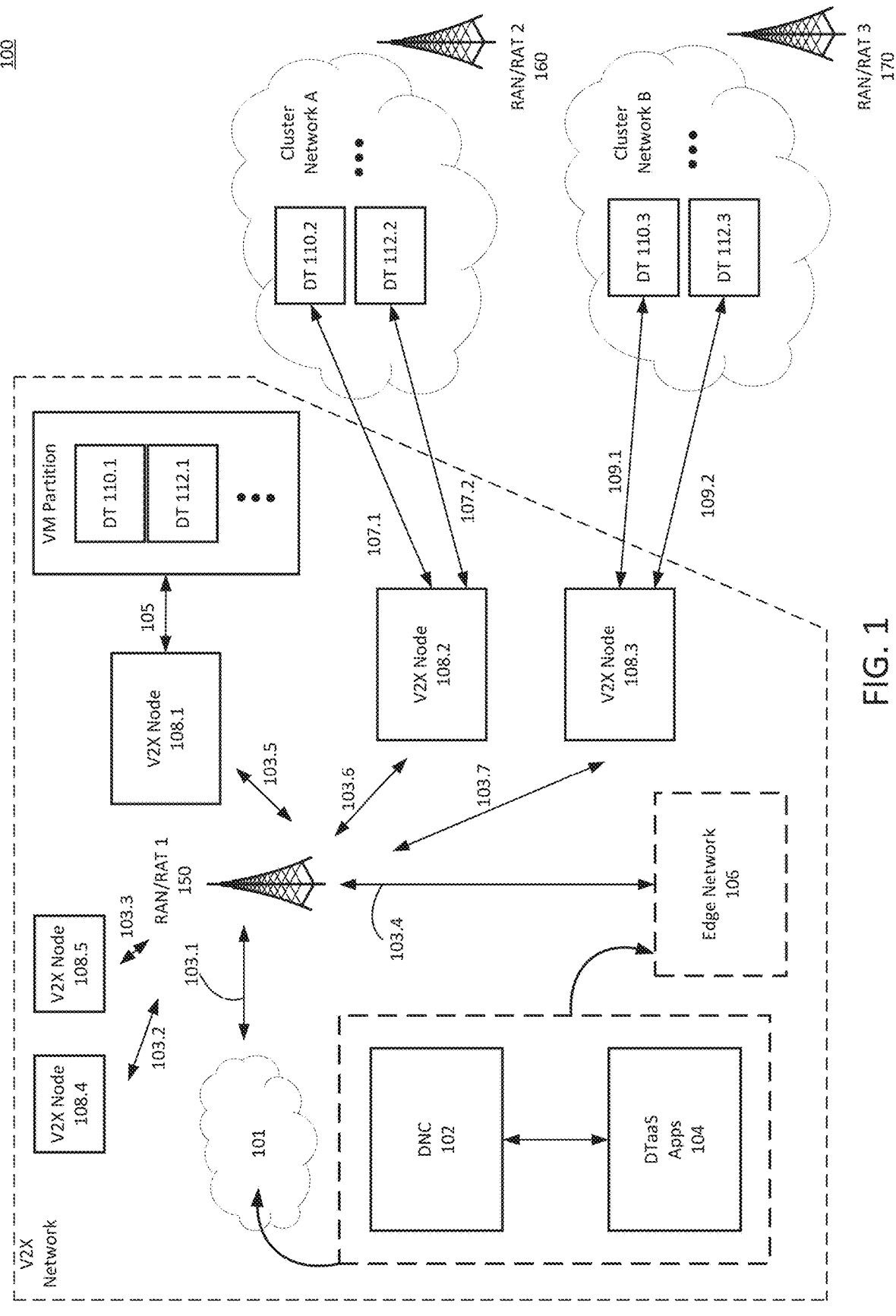
FIG. 1 illustrates a network-based architecture, in accordance with the disclosure.

In the following description, numerous specific details are set forth in order to provide a thorough understanding of the present disclosure. However, it will be apparent to those skilled in the art that the implementations of the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

I. Overview of V2X and DTaaS Interaction

Digital Twin as a Service (DTaaS or DXaaS) emerged in the same way the software industry once evolved from the product-based model to Software as a Service (SaaS)—driven by technological advancements and demands from the market place. DTaaS allows for flexibility, scalability, and greater integrations among various service providers, and thus gives sustainable improvements. DTaaS generally uses a value-based subscription model to provide digital twin services to subscribers. DTaaS typically relies upon a software-defined infrastructure and software-defined networks (SDNs), as the agility needed for digital twins is simply too great for conventional hard-wired, hardware-dependent compute, storage, and network architectures. Thus, recent developments in DTaaS has driven a re-imagining of the data center itself. A summary of known DTaaS requirements and tradeoffs is provided in the Appendix for clarity and ease of explanation.

As discussed herein, the disclosure is directed to the use an architecture that supports DTaaS with a vehicle-to-everything (V2X) network protocols. In some cases, the DTaaS interactions may require large message exchanges involving a primary twin with one or more secondary twins, where the primary twin typically interfaces with a UE, Service Provider (SP), or other resource in need of DTaaS capabilities. However, large message sizes can result in network congestion even when no DT nodes are present. Thus, the use of multi-channel (and/or multi-RAT) communication enables DT nodes to listen on different channels (and/or different RATs) while still maintaining V2X workload context.

Existing solutions [2] handle the challenge of such increased overhead communications by adding more bandwidth to Edge networks. However, increasing communications bandwidth is costly, as conventional solutions require the buildout of physical infrastructure, the adoption of next generation (e.g. "6G") technology, and/or the replacement of network infrastructure equipment.

The disclosure as discussed in further detail herein addresses these issues by applying communication-side optimization to reduce communication overhead while meeting necessary reliability and latency requirements. Moreover, the disclosure as further discussed herein utilizes DT resources for V2X environments using both virtual and physical "twin" resources to achieve improved resiliency. However, to optimize redundancy costs, the ratio of virtual DT nodes to physical DT nodes may be asymmetrical. That is, computational and data intensive V2X workloads may deploy 3-5 virtual DT nodes, but only 1-2 physical DT nodes (or even no physical DT nodes). An asymmetric approach to DT redundancies involving both virtual and physical resources enables greater flexibility in managing deployment costs.

Furthermore, the disclosure leverages the use of virtual and physical digital twins in a V2X network environment to support DTaaS. Conventionally, a virtual DT may be implemented as a virtual model designed to accurately reflect the behavior of a physical object. As discussed herein, the virtual DTs implemented to support DTaaS may correspond to a particular component that exists in the V2X network, such as a vehicle or robot that may have autonomous or semi-autonomous capabilities. The virtual DTs as discussed herein may provide additional or alternate functions, thereby expanding upon the traditional use and facilitating and leveraging compatibility within a V2X network.

In contrast with the virtual DTs, the disclosure further implements physical DTs, which may have any suitable subset of functionality compared to its real-world "twin," and which again may correspond to a particular component that exists in the V2X network, such as a vehicle. Thus, the physical DT may comprise identical or similar sensors, of a subset of such sensors, as the real-world object. For the illustrative and non-limiting scenario in which the physical DT is identified with a vehicle, the physical DT may include one or more cameras that correlate to those used by the vehicle, accelerometers, gyroscopes, sensors identified with an inertial measurement unit (IMU), etc. These sensors produce data about different aspects of the physical object's performance, which may then be shared with other nodes in the V2X architecture as discussed herein and used as part of a DTaaS application-based architecture. In some instances, the data provided by the physical DT may be transmitted or otherwise relayed to a processing system of another V2X node, such as the virtual DT node discussed above, and applied to the digital copy. In this way, virtual and physical DTs may reduce network congestion and facilitate an expanded set of processing operations to be performed more efficiency than would be via direct communications with the real-world objects that are "twinned."

II. Overview of a Network Architecture

FIG. 1 illustrates a network architecture, in accordance with the disclosure. As shown in FIG. 1, the network architecture 100 comprises any suitable number and/or type of various communication networks, each corresponding to a respective radio access technology (RAT) that supports communications in accordance with a respective radio access network (RAN). As shown in the non-limiting and illustrative scenario as shown in FIG. 1, the RAN/RAT 1 corresponds to a V2X RAN/RAT and supports V2X communications among the various V2X nodes 108.1-108.5. The RAN/RATs 2 and 3 correspond to other RAN/RATs, which may comprise a partition of the V2X network such as a sub-net, and which are shown in FIG. 1 as supporting different cluster networks to illustrate different types of deployment scenarios. Thus, the RAN/RATs 2 and 3 respective support the cluster networks A and B, which may also correspond to a V2X RAN/RAT, or alternatively the cluster networks A and B may correspond to any other suitable type or RAN/RAT, which may be the same or different than one another. Thus, in one non-limiting and illustrative scenario as shown in FIG. 1, the RAN/RATs 2 and 3 may correspond to a V2X RAN/RAT, or any other suitable RAN/RATs such as IEEE 802.11p WLAN based communication protocols, any suitable type of 3GPP standard, including new radio (NR) standards, the most recent as of this time of writing being 3GPP R16 published in June 2019, and which may comprise communication protocols that are currently and commonly referred to as "5G" protocols, long-term evolution (LTE) protocols, Bluetooth communication protocols such as Bluetooth low energy (BLE), asynchronous transfer mode (ATM) communication protocols, X.25 protocols, SHF communication protocols, New Radio (NR)-V2X, etc.

In any event, each of the RAN/RATs 1, 2, and 3 enable connectivity between the various nodes (i.e. V2X nodes, digital twins, etc.) within each respective network, as well as communications with a core network 101. The core network 101 may be comprised of any suitable number and/or type of computing systems, networks, etc. The core network 101 thus represents a primary supporting network, and may comprise cloud computing systems or any other suitable type of networks, computing systems, platforms, etc., including known systems, to support core network functionality. As further discussed herein, the core network 101 may support any suitable number of applications to monitor and/or control users of the communication network architecture 100, which may be DTaaS subscribers. In doing so, the communications that occur within the V2X network, the cluster network A, and/or the cluster network B may be adjusted to increase efficiency and to provide other benefits, as will be further discussed below.

The core network 101 is communicatively coupled to any suitable number of V2X nodes 108.1-108.N via any suitable number of links 103. The links 103 thus represent any suitable number and/or type of connections including wireless connections, wired connections, or combinations of these. As shown in FIG. 1, the core network 101 is connected to the V2X nodes 108 via a base station 150 and an optional edge network 106, which are provided as a non-limiting and illustrative scenario. Thus, the base station 150 and edge network 106 may represent a collection of any suitable number and/or type of components, wireless connections, wired connections, etc., that ensure communications are maintained between the core network 101 and the V2X nodes 108. The cluster networks A and B are likewise coupled to the core network 101 via their respective base stations 160, 170, and may alternatively be coupled to the edge network 106 or a different edge network. The DTs 110 are also configured to communicate directly with one another, as well as within their own respective cluster networks. The connections between the DTs 110, 112 that are supported via each of the cluster networks A and B are not shown in detail in FIG. 1 for purposes of brevity.

Again, and as will be discussed in further detail below, the V2X nodes 108.1, 108.2, and 108.3 are illustrated in FIG. 1 as part of three different deployment scenarios. In each of these deployment scenarios, the V2X nodes 108.1, 108.2, and 108.3 may be implemented as a primary V2X node that forms part of a respective digital twin cluster with other virtual and/or physical DT nodes 110, 112. Although each DT cluster deployment scenario as discussed herein illustrated both virtual (110) and physical (112) DT nodes, this is a non-limiting and illustrative scenario, and each DT cluster may comprise any suitable number and/or combination of physical and/or virtual DT nodes, and may alternatively include only virtual or only physical DT nodes.

For the first of these deployment scenarios, the V2X node 108.1 forms part of a DT cluster with the DTs 110.1, 112.2 based on a virtualized local node within the V2X network. As shown in FIG. 1, the virtualized local node is implemented as a virtual machine (VM) partition. Thus, the V2X node 108.1 communicates with other V2X nodes 108 within the V2X network via the RAN/RAT protocols in accordance with the V2X communication network using the links 103, and communicates with the DTs 110.1, 112.1 within the DT cluster via shared memory, which is represented as the communication link(s) 105.

For the second deployment scenario, the V2X node 108.2 forms part of a DT cluster with the DT nodes 110.2, 112.2, which are accessed via the cluster network A supported by the RAT/RAN 2. The V2X node 108.2 accesses the DT nodes 110.2, 112.2 via respective DTaaS interfaces. Thus, the V2X node 108.2 communicates with other V2X nodes 108 within the V2X network via the RAN/RAT protocols in accordance with the V2X communication network, and communicates with the DT nodes 110.2, 112.2 via the communication protocol identified with the RAN/RAT 2 supported by the cluster A network, which is represented as the communication link(s) 107.1, 107.2.

For the third deployment scenario, the V2X node 108.3 forms part of a DT cluster with the DT nodes 110.3, 112.3, which are accessed via the cluster network B supported by the RAT/RAN 3. The V2X node 108.3 implements DTaaS interfaces exposing DTaaS capabilities to other V2X nodes on the V2X network. Thus, the V2X node 108.3 communicates with other V2X nodes 108 within the V2X network via the RAN/RAT protocols in accordance with the V2X communication network, and communicates with the DT nodes 110.3, 112.3 via a communication protocol defined in accordance with the RAN/RAT 3 that is supported by the cluster B network, which is represented as the communication link(s) 109.1, 109.2.

Thus, the core network 101, base stations 150, 160, 170, and the optional edge network 106 may collectively support communications between the core network 101, the V2X nodes 108, and the virtual DT nodes 110, 112 in accordance with any suitable number and/or type of communication protocols. Moreover, it is noted that although the digital twin network controller (DNC) 102 and the DTaaS applications 104 are illustrated in FIG. 1 as being instantiated as part of the core network 101, this is also a non-limiting and illustrative scenario. The DNC 102 and the DTaaS applications 104 may additionally or alternatively be instantiated in any suitable components within the network architecture 100, such as within the edge network 106. The functionality of the DNC 102 and the DTaaS applications 104 are further discussed below.

The network architecture 100 as shown in FIG. 1 is described herein in a non-limiting and illustrative manner. The techniques described herein are not limited to V2X communications, although the use of V2X communications may be particularly advantageous in light of the use of multicast group messages that are implemented via V2X communication protocol. To this end, V2X (vehicle-to-everything) represents a communication interface and collection of standards that support communications between any suitable type of entities (such as vehicles, autonomous robots, etc.) and any other suitable entity that may affect, or may be affected by, one another. Thus, as used herein, the term "V2X" may include may include standards related to any suitable number of different radio access technologies (RATs) that incorporate more specific types of communications. These RATs and their accompanying standards may facilitate vehicle-to-vehicle (V2V) communications, vehicle-to-infrastructure (V2I) communications, vehicle-to-pedestrian (V2P) communications, vehicle-to-cloud (V2C) communications, vehicle-to-satellite (V2S) communications, etc.

To provide some non-limiting and illustrative scenarios, the V2X communication protocol as described herein may implement IEEE 802.11p WLAN based standards, the most recent as of the time of this writing being published in 2013, or the European Standard ETSI ITS-G5 Standard, the most recent as of the time of this writing being published in 2011. Furthermore, the V2X communication standard as used herein may incorporate 3GPP (cellular V2X (C-V2X)), the most recent as of this time of writing being 3GPP R16 published in June 2019. The 3GPP standard is based on LTE as the underlying technology, and because the C-V2X functionalities are based on LTE, it is often referred to as LTE-V2X. The scope of functionalities supported by C-V2X includes both direct communication (V2V, V2I) as well as wide area cellular network communication (V2N).

In any event, the network architecture 100 as shown in FIG. 1 may include any suitable number of V2X nodes 108, which may represent various physical components that comprise the overall V2X network. These V2X nodes 108 may cover a wide area such as a city or a larger region, and may include components identified with vehicles, roadside units (RSUs), and any other suitable components such as those identified with roadside infrastructure. The V2X nodes 108 as discussed herein may include any of these implementations, and may additionally or alternatively include other components such as the edge network 106, cloud computing components, etc. to facilitate V2X communications to be performed in accordance with the implementations described herein.

As will be discussed in further detail below, the V2X nodes 108 may exist as standalone nodes (such as the V2X nodes 108.4, 108.5) or may be implemented as part of a digital twin (DT) cluster (such as the V2X nodes 108.1, 108.2, 108.3). In any event, the network architecture 100 enables each V2X node 108 to communicate with one another, with other DT nodes 110, 112, with the DNC 102, and with the DTaaS apps 104. The network architecture 100 also enables each of the DT nodes 110, 112 to communicate with their receptive primary V2X nodes 108, with one another, as well as with the DNC 102 and the DTaaS apps 104. Moreover, within the network architecture 100, the DT nodes 110, 112 may communicate with each other directly. This may be particularly advantageous to enable the virtual DT cluster nodes 110 to obtain real world data/states from one or more physical DT nodes 112. Furthermore, as the DT nodes 110, 112 may be redundant backups for other DT nodes (twins of twins), and need to synchronize states between each other, such direct communicate between the DT nodes may facilitate such synchronization functions. The communication links to support these direct communications among the DT nodes are not shown in FIG. 1 for purpose of brevity, but may be implemented via any suitable number and/or type of communication links and/or communication protocols used within the network architecture 100.

III. Overview of a DT Cluster as Part of the System Architecture

Figure 2:
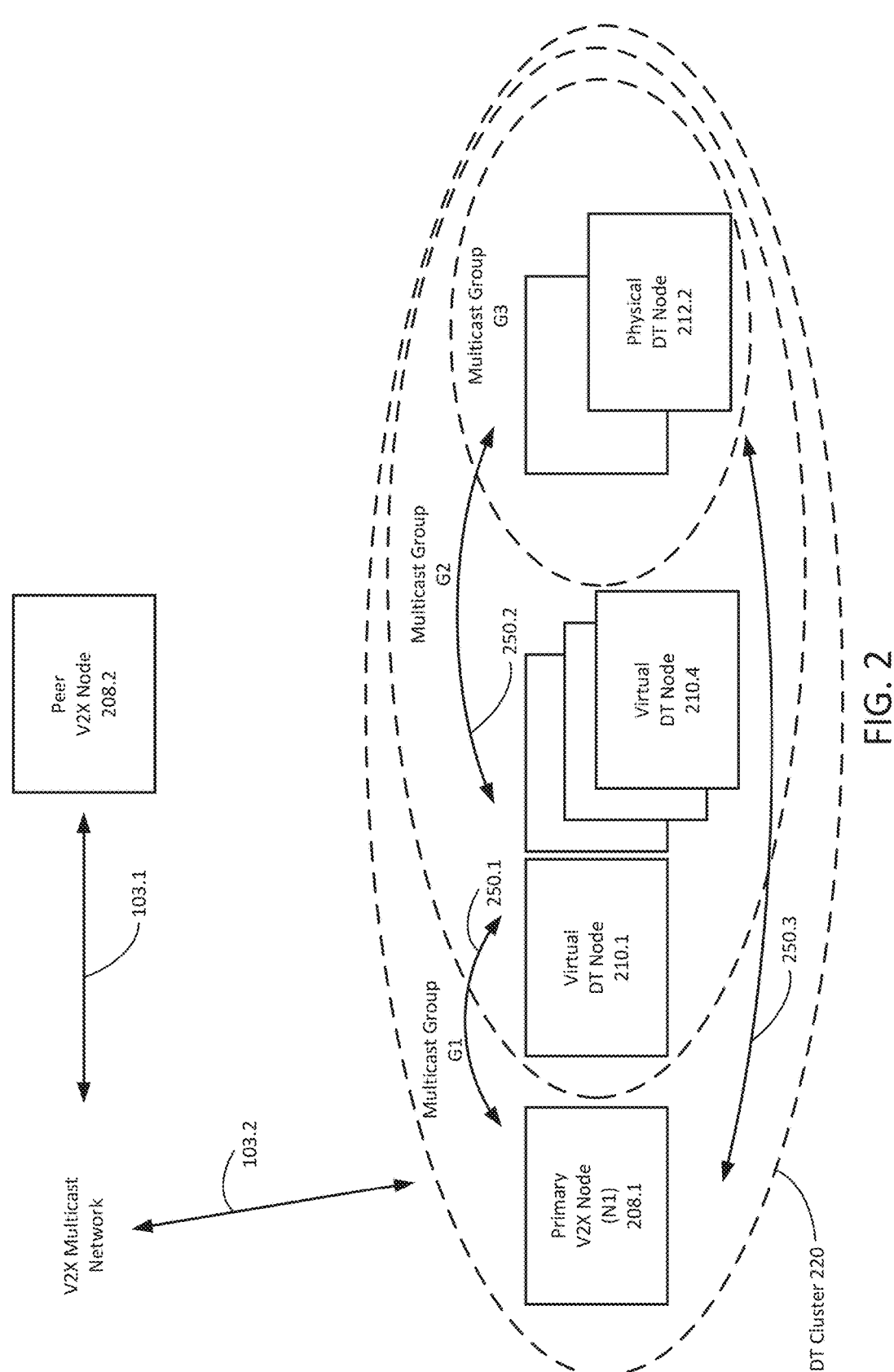
FIG. 2 illustrates a multicast group for V2X digital twin (DT) scalable messaging, in accordance with the disclosure.

FIG. 2 illustrates a multicast group for V2X digital twin (DT) scalable messaging, in accordance with the disclosure. As shown in FIG. 2, a digital twin (DT) cluster 220 comprises a primary V2X node 208.1, which may be identified with any suitable components of V2X network such as a vehicle, RSU, etc. The primary V2X node 208.1 and peer V2X node 208.2 may be identified with any of the primary V2X nodes 108 as shown and discussed herein with reference to FIG. 1. The DT cluster 220 may likewise be identified with any one of the DT clusters as discussed above with respect to FIG. 1 in accordance with the various deployment scenarios. Thus, in a non-limiting and illustrative scenario, the primary V2X node 208.1 may be identified with any one of the V2X nodes 108.1, 108.2, 108.3, and the virtual DT nodes 210 and the physical DT nodes 212 may be identified with the respective DT nodes 110, 112 corresponding to each of these DT clusters.

It is noted that the peer V2X node 208.2 may provide additional services, and may include manageability consoles, scheduling, or orchestration services including those used by the DNC 102 to communicate directly with the DT nodes 210, 212. Thus, the DNC 102 and other admin services may communicate via the primary V2X node 208.1, which then forwards such communications to the backend. In this way, the transparency of the DT nodes 210, 212 being virtual/invisible twins is preserved. However, it is noted that preserving the transparency of no redundancy in the primary node 208.1 has performance and latency costs. These costs are avoided by oversight services, which are provided by the DNC 102 by exposing the cluster network/group message directly, as further discussed herein.

Thus, the primary and peer V2X nodes 208.1, 208.2 may communicate with the V2X network using a V2X multicast network via the links 103. The virtual DT nodes 210 and the physical DT nodes 212 may likewise communicate with the V2X network (such as the DNS 102, DTaaS apps 104, etc.) via their connections within their respective cluster networks, as discussed above with reference to FIG. 1. The links 250.1, 250.2, 250.3 thus represent communication links that enable the primary V2X node 208.1 to communicate with the virtual DT nodes 210 and the physical DT nodes 212 within the DT cluster 220, and also allow the virtual and physical DT nodes 210, 212 to communicate with one another within their respective cluster network. That is, the primary V2X node 208.1 communicates with the virtual and physical DT nodes 210, 212, but needs to do so coexisting (and sharing the same communication resources) with normal V2X node communications. This may be achieved efficiently by using a group channel/address in accordance with the multicast groups as shown in FIG. 2. Thus, in the non-limiting and illustrative scenario as shown in FIG. 2, the links 250.1, 250.2, 250.3 represent any suitable number and/or type of communication links that support the exchange of API messages and/or any suitable type of data between the primary node 208.1, the virtual DT nodes 210, and the physical DT nodes 212.

In some instances, which are discussed in further detail herein, each of the primary node 208.1, the virtual DT nodes 210, and the physical DT nodes 212 may be addressed in the V2X multicast network via the use of multicast group messages. To this end, The DT cluster 220 forms a multicast group G1 comprising subsets of multicast groups G2 and G3. Furthermore, it is noted that the G3 multicast group need not be accessed via a G2 node. Alternatively, the primary node 208.1 may interact with a G2 node and/or a G3 node directly, such as via the communication links 250.1, 250.3. Thus, virtual DT nodes 210.1-210.N and/or the physical DT nodes 212.1-212.M may be implemented with a DT frontend 304, as further shown and discussed herein with reference to FIG. 3A, which enables such direct communications between the primary node 208.1, the virtual DT nodes 210.1-210.N, and/or the physical DT nodes 212.1-212.M. The DT cluster 220 as shown in FIG. 2 includes a primary V2X node 208.1, any suitable number N of virtual DT nodes 210.1-210.N, and any suitable number M of physical DT nodes 212.1-212.M. Again, to optimize redundancy costs, the ratio of the virtual DT nodes 210 to the physical DT nodes 212 may be asymmetrical, and thus N and M may designate different number values, although the disclosure is not limited in this regard, and N and M may also be equal to one another. The primary V2X node 208.1, the virtual DT nodes 210.1-210.N, and the physical DT nodes 212.1-212.M may be implemented as virtual machines (VMs) on the same host, or as agents running on different hosts.

The peer node 208.2 may be implemented as an agent running on one or more different hosts than the V2X nodes included in the DT cluster 220. Again, and as noted above with respect to FIG. 1, although a single peer V2X node 208.2 and DT cluster 210 are shown in FIG. 2, the network architecture 100 may implement any suitable number of peer nodes 208 and DT clusters 220, which may communicate in accordance with a V2X multicast network or other RAT/RAN communication protocols, as further discussed herein.

The primary V2X node 208.1 may be implemented as any suitable combination of hardware and/or software to enable the primary V2X node to be a V2X workload participant with DT support, with additional details provided below. Similar to the peer V2X node 208.2, the primary V2X node 208.1 may also be identified with any suitable components of the V2X network such as a vehicle, an RSU, etc. Thus, and as further discussed below, the primary V2X node 208.1 and the peer V2X node 208.2 are configured to communicate with the core network 101 via the communication links 103.1, 103.2, which again may comprise a portion of a multicast network used to support V2X communications. The primary V2X node 208.1 and the peer V2X node 208.2 may each further support digital twin capabilities, as further discussed herein.

However, and as further described herein, the primary V2X node 208.1 need not be addressed and/or messaged initially as is the case for conventional usage, but instead the V2X multicast network may facilitate messages being transmitted to the entire DT cluster 220. As a result of such communications, various processing tasks, which may be requested by the DNC 102, the DT apps 104, etc., may be executed by the various nodes of the DT cluster 220 without the primary V2X node 208.1 relaying such messages and/or transmissions. Thus, although the primary V2X node 208.1 is designated as such in FIG. 2, it is noted that this may reflect an initial or preferred identity and function for the primary V2X node 208.1, as any of the nodes within the DT cluster 220 may alternatively provide the same processing functionality as the primary V2X node 208.1.

The virtual DT nodes 210.1-210.N may be implemented as virtual digital twins (DTs) of other suitable components within the V2X network as noted above (i.e. as virtual DTs), and may represent one or more virtual DTs of the primary V2X node 208.1. Thus, the virtual DT nodes 210.1-210.N may be implemented as any suitable combination of hardware and/or software to function as virtual V2X twins in this manner. In this way, the virtual DT nodes 210.1-210.N are configured to perform any suitable portion (or all) of a workload processing transaction that may be performed by the primary V2X node 208.1, and may perform additional functions such as analytics, caching, offloading, specialized processing, etc., as further discussed herein.

The physical DT nodes 212.1-212.M may be implemented as physical digital twins (DTs) of other suitable components within the V2X network as noted above (i.e. as physical V2X twins), and may represent one or more physical DTs of the primary V2X node 208.1. Thus, the physical DT nodes 212.1-212.M may be implemented as any suitable combination of hardware and/or software to function as a physical V2X digital twin in this manner. Thus, the physical DT nodes 212.1-212.M are configured to perform any suitable portion (or all) of a workload processing transaction that may be performed by the primary V2X node 208.1, as well as any suitable portion (or all) of a workload processing transaction that may be performed by the virtual DT nodes 210.1-210.N. Additionally, the physical DT nodes 212 may be implemented with any suitable subset (or all) of the physical attributes of the primary V2X node 208.1, such as a similar type of vehicle, similar sensors, cameras, actuators, etc.

Again, the combination of nodes, i.e. the primary, virtual, and physical DT nodes 208, 210, 212, respectively, represent a DT cluster, which is designated as the DT cluster 220 in FIG. 2. The DT cluster 220 may therefore, in one non-limiting and illustrative scenario, represent a group of any suitable number of nodes in which the group "appears" to the core network 101 and/or other peer V2X nodes (such as the peer V2X node 208.2) as a singleton. However, at the network and messaging layer, messages may be replicated across multiple nodes within the DT cluster 220, multicast, or broadcast to give the appearance of a simple request-response protocol interaction. In accordance with this architecture, the disclosure provides significant advantages, which are discussed in further detail below.

IV. Overview of the General System Architecture and Operation

Again, the disclosure applies a digital twin (DT) concept in V2X networks, in which each V2X entity in the network may have a corresponding DT node that acts as an agent, and which receives a copy of V2X node service messages. These service messages enable a DT node to anticipate, analyze, and replicate or otherwise imitate to improve V2X experiences. The disclosure also describes a V2X workload simulation controller, which simulates complex deployment scenarios involving various configurations of DT nodes.

The disclosure also utilizes a DT Network Controller (DNC), which is shown and discussed in further detail in FIG. 3. The DNC manages asymmetrical virtual DT nodes 210 and physical DT nodes 212, ensuring that DT nodes 210, 212 transmit and receive DT messages (such as via the communication links in accordance with their respective RAT/RAN networks) according to the type and function of the DT nodes, while maintaining a consistent state for the primary V2X node 208.

The disclosure also utilizes broadcast/multicast/groupcast networking to deliver DT messages efficiently, as illustrated via the multicast groupings as shown in FIG. 2 with respect to a DT cluster, as well as with respect to other V2X nodes 208, and other virtual and/or physical DT nodes 210, 212 that operate with the network architecture 100. Thus, and with reference to FIG. 2, it is noted that there are two types of DT messages. The first type of DT messages include messages exchanged among the DT nodes within the DT cluster 220 (i.e. the primary, virtual, and physical DT nodes 208, 210, 212). These types of messages may utilize the communication links 250 as shown in FIG. 2 as noted above. The second type of DT messages include messages exchanged between any DT nodes within the DT cluster 220 and DT users/subscribers (which could be V2X nodes/users as well) as well as communications with the DTaaS apps 104. These messages may utilize the communication links 103 as shown in FIGS. 1 and 2 as noted above, as well as other communication links between the DT clusters 220 (not shown in FIG. 1). For both types of DT cluster message, the disclosure proposes a scalable DT messaging substrate that leverages the broadcast nature of V2X environment and offers cost-effective communications.

It is noted that conventionally, a central/primary DT node within a V2X network functions as a front-end to communicate with all peer V2X nodes. However, in the proposed approach described in further detail herein, all DT nodes of the DT cluster 220 containing the primary V2X node 208 subscribe to the same messages and may have the same interactions. This approach may have scalability benefits that are advantageously realized in V2X networks, as V2X networks are often based on broadcast/multicast networks. Scalability benefits may be especially significant for large or latency-sensitive messages, since transmission cost is paid only once. In contrast, for conventional DT interactions, the transmission cost is paid initially to communicate with the primary node, and then paid again to communicate with each DT node. Consequently, DT message transmission cost in accordance with the present disclosure scales linearly for V2X workloads involving many DT nodes.

The disclosure further introduces a group-based DT message containing a common portion, and in addition contains one or more vehicle/geographic area-specific portions. The common portion is broadcast once for all DT nodes 210, 212 and/or V2X nodes 208, and the vehicle-specific portions of the message are multicast/groupcast to only the DT nodes 210, 212 and/or V2X nodes 208 working with the vehicle-specific portion. By refactoring workload data to be sensitive to DT grouping dynamics, the use of broadcast/multicast/groupcast networks is optimized for DT redundancies, which increases efficiency nearly exponentially while maintaining near-linear network loading. Due to the perceived "savings" in network bandwidth, the transmission of additional copies of "grouped" DT messages also functions to improve the packet delivery success ratio (such as where noisy networks might experience non-linear degradation, this nearly linear degradation is also retained), or for on-demand services reliable messaging translates to increased service reliability, without requiring costly network infrastructure investment.

The disclosure also implements multiple network channels to communicate with DT nodes while maintaining a common V2X workload context. That is, DTaaS message transmission may utilize multiple channels as the size of the DTaaS contents are increased, or as the number of DT clones increases. Thus, if a current channel becomes saturated, a second channel may be allocated. In multi-channel operation, V2X users (i.e. DTaaS subscribers) may need to know which channel/subchannel the next subscribed DTaaS service message will arrive. The disclosure provides a pre-agreed default/primary channel-based mechanism to coordinate DT nodes on different channels. In accordance with the proposed mechanism, a notification about which DTaaS service messages are to be offloaded to which channels/subchannels is transmitted over the primary/default channel. As a result, associated users are informed of the particular channel to receive their subscribed DTaaS service messages.

This disclosure is also differentiated from conventional solutions via the implementation of the DNC 102, which is unique to and customized for V2X networks. Additionally, the disclosure is further differentiated from conventional solutions via the implementation of network variables, which act to bridge the DT virtual and physical environments. Network variables maintain a set of properties that specify acceptable (or unacceptable) synchronization states between virtual and physical counterparts.

V. The Operation of the DTaaS Architecture

Figure 3A:
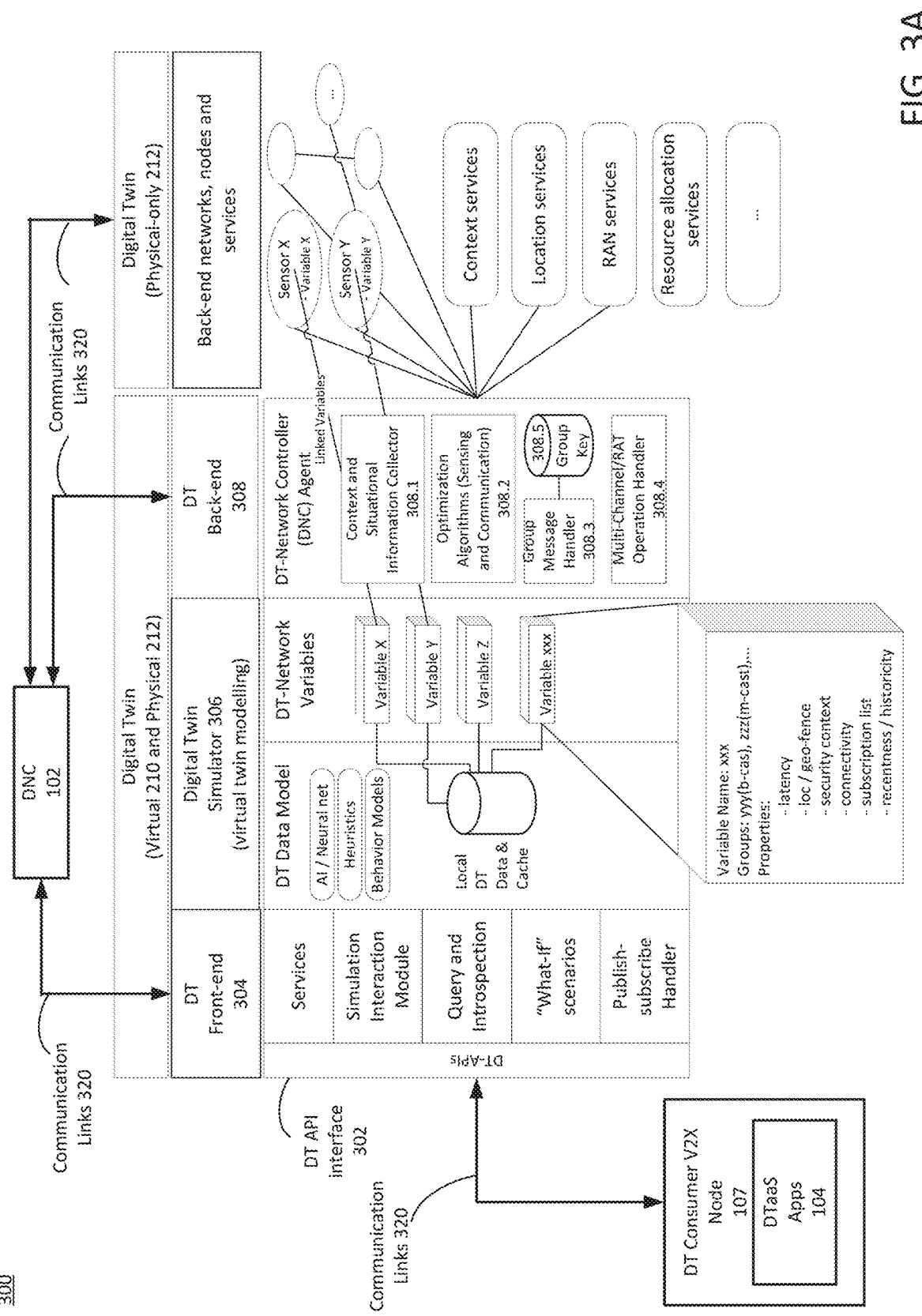
FIG. 3A illustrates a digital twin as a service (DTaaS) architecture providing DT services, in accordance with the disclosure.

FIG. 3A illustrates a digital twin as a service (DTaaS) architecture, in accordance with the disclosure As further discussed herein, DTaaS architecture as shown in FIG. 3A provides DT services. As noted above with reference to FIG. 1, the virtual and physical DT nodes 210, 212, facilitate a DTaaS interface that exposes various data objects to the V2X network that specify expected availability, reliability, latency, safety-critical, and security parameters that are conditions of reading/writing the data object. A DT node 210, 212 may then customize a message based on the exported parameters. Since each data object may have different parameters, each data object sent/received over the V2X network may involve utilizing different edge network customizable QoS settings. Thus, the virtual or physical DT 210, 212 may act as a local orchestration agent to customize the network to achieve a peer DT node's preferred QoS parameters for a given data object.

As shown FIG. 3A, the DTaaS service architecture 300 comprises the DNC 102 as discussed herein with reference to FIG. 1. The DTaaS service architecture 300 also comprises one or more virtual DT nodes 210 and one or more physical DT nodes 212. The architecture and functionality of these nodes is further discussed below. It is noted that, as shown in FIG. 3A, the virtual DT nodes 210 and the physical DT nodes 212 may have similar or identical configurations with respect to their functions and interfaces. However, the physical DT nodes 212 may additionally comprise components exclusive to the physical DT nodes 212, such as sensors, as well as access to back-end networks, nodes, and services, as illustrated in FIG. 3A.

With continued reference to FIG. 3A, the DTaaS apps 104 are executed as part of a DT consumer V2X node 107, which again may be instantiated in the core network 101, in the edge network 106, or in any suitable computing network that is configured to communicate with the various nodes of the network architecture 100. The DTaaS apps 104 may thus represent any suitable number of applications identified with DTaaS subscribers, which interact with DTaaS services APIs provided by a front-end of the DT nodes 210, 212 (i.e. the virtual and physical DT nodes 210, 212). The various V2X nodes 108 within the V2X architecture 100, as well as the DT nodes 110, 112, as discussed above with reference to FIG. 1 may represent such DTaaS subscribers, which are thus configured to retrieve real-time or simulated information about a particular road segment, a geographic area, etc., via operation of the DTaaS system as discussed herein.

As shown in FIG. 3A, the DT nodes 210, 212 are configured to maintain a virtual digital twin data model of a corresponding V2X node, such as the primary V2X node 208.1 as discussed above. The DT nodes 210, 212 may comprise any suitable number and/or type of components, such as a neural network, heuristics, and behavior models as shown in FIG. 3A. The DT nodes 210, 212 may thus be used to support DT-API requests. The DT nodes 210, 212 may achieve the functionality as described herein via the execution of instructions and/or programmable code as part of the implementation of the DT nodes 210, 212 on a virtual machine (VM). As shown in FIG. 3A, the DT nodes 210, 212 generally comprise three components: a DT front-end 304, a DT simulator 306, and a DT back-end 308.

The DT front end 304 is configured to perform any suitable number and/or type of services to support the various types of DT-API requests that are received via the DT-API interface 302. The different functions are illustrated in FIG. 3A via respective modules. The DT-API interface 302 may thus represent any suitable number of network layers and/or communication links to facilitate receiving DT-API requests via the DTaaS apps 104. As shown in the non-limiting and illustrative scenario as shown in FIG. 3A, the DT front end 304 may include various modules to support performing simulation interaction, performing model queries (on-demand or publisher-subscriber based) and introspection, processing "what-if" workloads, and any other suitable services.

The DT-API requests may be received directly via the DTaaS apps 104 via communications between the DT nodes 210, 212 and the core network 101, the edge network 106, etc., via the communication protocol identified with the RAT/RAN network of which the DT nodes 210, 212 are supported. Additionally or alternatively, the DT nodes 210, 212 may receive such DT-API requests via the primary node 208 of the cluster 220 in which the DT nodes 210, 212 form a part. Thus, the communication links 320 may be identified with any suitable number and/or type of wired and/or wireless links based upon the particular deployment scenario of the cluster 220 and/or the manner in which the DT-API requests are received via the DT nodes 210, 212.

The DT simulator 306 may comprise any suitable type of architecture configured to facilitate the generation and/or maintenance of a data model, and may include components such as a neural network, heuristics, and behavior models that may be used to support the DT-API requests. The data model may be with respect to another V2X node 208, such as the primary V2X node 208.1 as shown in FIG. 2. The data model that is maintained in this manner via the DT simulator 306 may thus contain any suitable number and/or type of model variables that enable the virtual or physical DT node 210, 212 to emulate a respective real-world object such as a V2X node 208. Thus, and as noted above, the virtual and/or physical DT node 210, 212 may receive updated data in the form of DTaaS service messages, or other suitable communications via a respective V2X node 208, such that the data model contains synchronized and up-to-date model variables. The data model, as well as the various model variables maintained via the data model, may be accessed via the DNC 102, other V2X nodes 208, other virtual and/or physical DT nodes 210, 212, etc., within the network architecture 100. The virtual and/or physical node 210, 212 may thus provide these model variables in response to such requests. In this way, the virtual and/or physical DT nodes 210, 212 may be accessed in response to DT-API requests, which may be received via the DTaaS service messages.

In one non-limiting and illustrative scenario, the DT simulator 306 maintains a set of network variables (NVs) that feed the DT data model, and which are connected to the DT back-end 308 sensors, nodes, and services. The network variables may constitute a portion of (or the entirety of) the network context information that is provided to the DNC 102 as discussed herein via the DNC agent, and may additionally or alternatively be provided to other V2X nodes 208, other virtual and/or physical DT nodes 210, 212, etc., within the network architecture 100.

Furthermore, the DT simulator 306 is configured to operate in a simulation mode to execute simulations and to perform model queries in response to requests received via the DT-API interface 302, which may comprise DTaaS service messages or any other suitable type of communications. In accordance with the simulation mode, the DT simulator 306 may execute certain actions in accordance with the model queries. However, such actions performed in the simulation mode do not affect the "online" or production mode content and state of the virtual or physical node 210, 212 identified with the execution of the simulation, nor do the simulation actions otherwise impact the operation of the network architecture 100. Instead, the actions executed during the simulation mode may enable a "test" of various changes to the respective V2X node corresponding to the maintained data model. In this way, such changes may be simulated, tested, and verified before being propagated to other nodes within the communication network architecture 100.

To provide a non-limiting and illustrative scenario, a sensor reporting a workload may sample a network of temperature, air quality, humidity, or any other suitable property. The results of a sensor sampling in this manner may then be aggregated to find an average or mean, or may inference a pattern over time. The aggregation function may thus be tested in accordance with the simulation mode, in which the sensors' actual values are ignored, and synthetic sensed values are supplied instead. Additionally, the aggregation function may be tested in the simulation mode where simulated aggregates are not shared with the production V2X nodes.

To provide additional non-limiting and illustrative scenarios, for a V2X use case, kinematic data of vehicles may be used to simulate detection of potential safety-risk-situation/crash in near future. Additionally or alternatively, simulations may be used for the detection of potential collision/safety-critical-situations with a vulnerable road user (VRU)/pedestrian. The simulations may also be executed to determine potential actions for vehicles to avoid such situations.

The DT back-end 308 may be implemented as a physical representation of the virtual DT architecture and context. Alternatively, the DT back-end 308 may represent a virtualized representation, which manages interactions with the physical real-world sensors and collects network context information and situational awareness information, as further discussed herein. The DT back-end 308 also comprises a component referred to herein as a DT Network Controller (DNC) Agent, which is configured to exchange the collected network context information and situational awareness information with the DNC 102, and follows instructions received from the DNC 102.

The DNC agent that forms part of the DT back-end 308 may be implemented via any suitable arrangement of processing circuitry executing instructions stored in a memory, and may be identified with the virtual machine (VM) on which the DT node 210, 212 is implemented. Thus, the DNC agent may perform the various functions as discussed herein via the execution of the various modules as shown in FIG. 3A, which may include the context and situational awareness information collector module 308.1, the optimization algorithm 308.2, the group message handler 308.3, and the multi-channel/RAT operation handler 308.4.

Figure 3B:
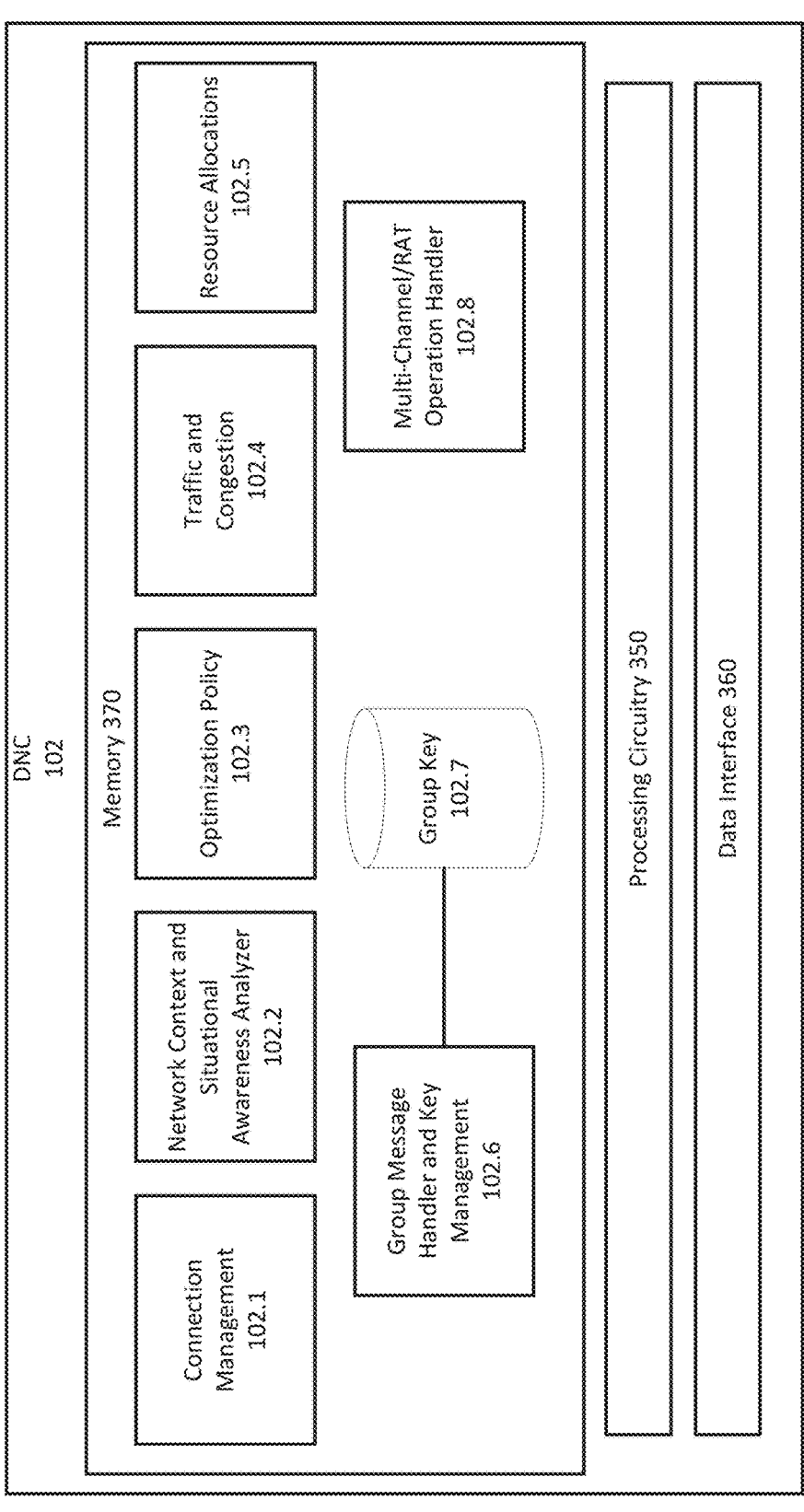
FIG. 3B illustrates a digital twin network controller (DNC), in accordance with the disclosure.

The DNC 102 is shown in FIG. 3A, with further details provided in FIG. 3B. As further discussed herein, the DNC 102 is configured oversee orchestration and lifecycle management of one or more DT node contexts/instances. That is, the DNC 102 ensures workload service-level agreements (SLAs) are achieved by making use of the capabilities of the DT nodes 210, 212. To do so, the DTs 210, 212 may implement any suitable type of interface (not shown) to enable the DT nodes 210, 212 to receive API messages from the DNC 102, to transmit API messages to the DNC 102, and/or to otherwise communicate with the DNC 102 in accordance with any suitable type of communication protocols. Such communications may be facilitated via the DT front-end 304 and/or the DT back-end 308 via the communication links 320, depending upon the type of data and/or API message content that are exchanged.

The DNC 102 is thus configured to expose DTaaS service requirements and information such as QoS, SLA, a number of active users for the service, the frequency of messages for the service, the importance of each part of each DTaaS message instant, etc. To do so, the DNC 102 also has interfaces with the network protocol stack via the execution of the various modules as shown in FIG. 3B, which includes the connection management module 102.1, the network context and situational awareness (NCSA) analyzer module 102.2, the multi-channel/RAT operation handler module (MOHM) 102.8, the traffic and congestion control module 102.4, the group message handler and key management module 102.6, etc. The DNC 102 generally orchestrates information sharing among these various modules to optimize communication operations for DTaaS services for multiple subscribers/users and/or DT nodes 210, 212 within a geographic area.

Again, the physical DT node 212 has some/all of the capabilities of the virtual DT node 210 and some/all of the physical attributes of the primary V2X node 208.1. This may include a similar type of vehicle, similar sensors, cameras, actuators, etc. The physical DT node 212 also implements any suitable type of interface (not shown) to receive API messages from the DNC 102, to transmit API messages to the DNC 102, and/or to otherwise communicate with the DNC 102 in accordance with any suitable type of communication protocols. In this way, the DNC 102 ensures consistency among each of the peer DT (virtual/physical) nodes in the V2X network.

VI. Operation of DT Network Controller (DNC)

The DT-Network Controller (DNC) as shown in FIGS. 3A and 3B functions to bridge the operation between the virtual and physical DT nodes 210, 212 within each of the DT clusters as discussed herein. The DNC 102 is configured to implement any suitable number of different functions, with non-limiting and illustrative functions being discussed in further detail herein with reference to FIGS. 3A and 3B.

Again, the DNC 102 may be implemented via software, hardware, or combinations of these, and may be referred to herein as an instantiated component with respect to a physical computing system, which may comprise a cloud computing system or other computing system identified with the core network 101, the edge network 106, etc. Thus, the DNC 102 may include processing circuitry 350 that may be identified with a suitable computing system. Alternatively, if the DNC 102 is implemented as a hardware component and/or a physical device that is connected to the core network 101 and/or the edge network 106, the processing circuitry 102 may be implemented as a part of such a device.

In any event, the processing circuitry 350 may be configured as any suitable number and/or type of processing circuitry and/or computer processors, which may function to control the DNC 102 and/or other components of the DNC 102. The processing circuitry 350 may be identified with one or more processors (or suitable portions thereof) implemented by the DNC 102 or a host system (such as the core network 101 or edge network 106). The processing circuitry 350 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

Regardless of the implementation, the processing circuitry 350 may be configured to carry out instructions to perform arithmetical, logical, and/or input/output (I/O) operations, and/or to control the operation of one or more components of DNC 102 to perform the various functions as described herein. The processing circuitry 350 may include one or more microprocessor cores, memory registers, buffers, clocks, etc., and may generate electronic control signals associated with the components of the DNC 102 to control and/or modify the operation of these components. The processing circuitry 350 may communicate with and/or control functions associated with the data interface 360 and/or the memory 370.

The data interface 360 may include any suitable type of components to facilitate the transmission and/or reception of any suitable type of data to the various V2X nodes 108/208 and V2X DT nodes 110/210, 112/212 as discussed herein. The data interface 360 may comprise hardware components, software components, or combinations of such components. The data interface 360 may comprise components identified with any suitable number and/or type of network layers, and include components associated with known data/network interface operations, configurations, and implementations.

The memory 370 stores data and/or instructions such that, when the instructions are executed by the processing circuitry 350, cause the DNC 102 to perform various functions as described herein with respect to the various DNC functions. The memory 370 may be implemented as any well-known volatile and/or non-volatile memory, including read-only memory (ROM), random access memory (RAM), flash memory, a magnetic storage media, an optical disc, erasable programmable read only memory (EPROM), programmable read only memory (PROM), etc. The memory 370 may be non-removable, removable, or a combination of both. The memory 370 may be implemented as a non-transitory computer readable medium storing one or more executable instructions such as logic, algorithms, code, etc. The memory 370 may be identified with memory and/or storage (or suitable portions thereof) implemented by the DNC 102 or a host system (such as the core network 101 or the edge network 106).

The instructions, logic, code, etc., stored in the memory 370 are represented by the various modules as shown, which may enable the functionality of the DNC 102 as disclosed herein to be functionally realized. Alternatively, the modules as shown in FIG. 3B that are associated with the memory 370 may include instructions and/or code to facilitate control and/or monitor the operation of hardware components implemented via the DNC 102. In other words, the modules shown in FIG. 3A are provided for ease of explanation regarding the functional association between hardware and software components. Thus, the processing circuitry 350 may execute the instructions stored in these respective modules, and optionally in conjunction with one or more other hardware components, to perform the various functions as discussed herein.

One of the functions of the DNC 102 is identified with the connection management module 102.1. The executable instructions stored in the connection management module 102.1 may facilitate, in conjunction with execution via the processing circuitry 350, the DNC 102 performing connectivity and synchronicity maintenance between the DT front-end 304 and the DT back-end 308 of one or more of the DT clusters 220 in the network architecture 100.

It is noted that the DNC 102 is configured to communicate directly with the DT back-end 308 of the virtual and physical DTs 210, 212 via the communication links 320. The DNC 102 is also configured to communicate with the DT front-end 304 of the virtual and physical DTs 210, 212 via a front-end API (such as a Maestro-A API layer) using DT APIs. Additionally or alternatively, the DNC 102 is configured to communicate with the virtual and physical DTs 210, 212 via communications with the primary V2X nodes 208 identified with the respective clusters 220 that contain the virtual and physical DTs 210, 212, as the primary V2X nodes may relay such communications to the virtual and physical DTs 210, 212 within the DT cluster 220 via the intra-cluster messages. In any event, any of these types of communications that occur between the DNC 102 and the virtual and physical DTs 210, 212 directly, or indirectly via the primary V2X nodes 208, may be referred to herein as "control signals," with the understanding that the nature, type, and/or protocol associated with such control signals may vary depending upon the type of communications (i.e. direct versus indirect, DT front-end versus DT back-end, the type of RAT/RAN, etc.). Such control signals as used here may thus constitute DTaaS messages, DT-API messages, broadcasted, or other suitable types of V2X messages.

The DNC 102 applies connectivity and synchronization optimization algorithms in this manner to ensure that any suitable number and/or type of network variable properties are enforced. Such network variables specify synchronization state requirements with respect to communications between the virtual DT nodes 210 and the physical DT nodes 212 identified with each respective DT cluster 220. Thus, such network variables may be directed to any suitable type network variable that is associated with and/or relevant to the time-based synchronization of the virtual and physical DT nodes 210, 212.

Some non-limiting and illustrative network variables in this context may indicate a recentness requirement such as one expressed in microseconds, a latency requirement such as one expressed in microseconds, etc. Additional network variables are shown in FIG. 3A and may be generated as part of the DT data model via the DT simulator 306 or otherwise measured via the DT nodes 210, 212. As shown in the non-limiting and illustrative scenario in FIG. 3A, the network variables may additionally or alternatively define a location or geofencing requirement, security context, connectivity requirements, a subscription list, etc. These network variables are then passed to the DT back-end 308 and communicated to the DNC 102 via the DNC agent as shown in FIG. 3A, which may include the DNC 102 accessing and/or receiving the network variables from the DT back-end 308 via the communication links 320 and the data interface 360. Alternatively, the network variables may be transmitted via the primary V2X node 208 identified with the DT cluster 220 to the DNC 102 (via the V2X communication network as shown in FIG. 1). The network variables may thus specify any suitable type of network properties that may be observed and/or simulated via the DT node 210, 212, and may different values with respect to data transmissions and data receptions via the DT node 210, 212.

Continuing the functions of the DNC 102 as identified with the connection management module 102.1, the DNC 102 is configured to manage the DT clusters 220 within the network architecture 100 to ensure that the synchronization state requirements specified by the network variables are met. To do so, the DNC 102 may identify the requirements for the DT cluster performing a specific type of workload processing transaction in accordance with a DT-API request, and indicate to the DTaaS apps 104 which workloads are to be assigned to which DT clusters 220 based upon the network variables and which network variables are to be configured. The workload processing transaction may be transmitted as part of a broadcasted DTaaS service message to the primary V2X node 208 within the respective cluster 220 in accordance with a V2X communication protocol. In other words, the DNC 102 functions to assign, to each V2X node 208, virtual DT node 210, and/or physical DT node 212, a workload processing transaction that meets the set of network communication parameters reported by that particular V2X node 208, virtual DT node 210, and/or physical DT node 212. Doing so ensures that the synchronization state requirements specified by the network are met. In this way, the DNC 102 functions to enforce the synchronization state requirements identified by the network variables among each of the DT clusters 220.

Continuing the functions of the DNC 102 identified with the connection management module 102.1, the DNC 102 is configured to perform orchestration of backend services hosted by the V2X infrastructure, such as roadside servers or core services deeper in the V2X communication network. In addition to or as an alternative to such orchestrations, the DNC 102 may also perform orchestration and lifecycle management of the DT context/instance. In doing so, the DNC 102 ensures workload service-level agreements (SLAs) are achieved by making use of DT node capabilities.

In other words, the DNC 102 may transmit control signals, which may be DT API messages via a front-end API, direct communications with the DT back-end 308, etc. These control signals are then received by the DT nodes 210, 212, which may provide flexibility within the DT cluster 220 with respect to which of the one of the DT nodes 210, 212 are executing specific network-related tasks. Such control signals may result in one of the virtual DT nodes 210 in the DT cluster 220 to perform a first network-related task with respect to a workload processing transaction, while another one of the virtual DT nodes 210 in the DT cluster 220 perform a second, different network-related task with respect to the workload processing transaction.

Thus, in a non-limiting and illustrative scenario, for a workload processing transaction that requires low latency updates but also requires data replication to a backend service, one of the DT nodes 210, 212 may be used on the DT front-end 304 to satisfy the low latency transaction requirements, while another one of the DT nodes 210, 212 may be used on the back-end 308 to synchronize the DT front-end 304 with the DT back-end 308. The DNC 102 may optionally act in collaboration with an orchestrator of a converged edge (i.e. far edge—near edge—regional cloud) architecture (such as via the edge network 106) to ensure the availability of computing/networking resources for the DTaaS.

The executable instructions stored in the optimization policy module 102.3, the traffic and congestion module 102.4, and the resource allocations module 102.5 may facilitate, in conjunction with execution via the processing circuitry 350, the DNC 102 providing recommendations to the virtual and physical DT nodes 210, 212 based upon monitored network parameters. Such monitored network parameters may represent any suitable number and/or type of state and/or network-based information with respect to the operation of the V2X nodes 108 and/or the various DT nodes identified with the DT clusters 220 within the network architecture 100. In a non-limiting and illustrative scenario, such network parameters may be obtained via the virtual and/or physical DT nodes 210, 212 within the cluster in accordance with any suitable techniques, including known techniques, and may indicate network congestion, latency, channel usage, RAT/RAN usage, a message periodicity for transmissions, etc. The network parameters may then be transmitted to and/or accessed by the DNC 102 via the DNC agent. The network parameters may be the network variables discussed herein with respect to the simulator 306, or alternatively may be separately collected and monitored network parameters.

The recommendations provided by the DNC 102 in response to the monitored network parameters may comprise controls signals that indicate instructions that result in the primary V2X node 208, one or more virtual DT nodes 210, and/or or more physical DT nodes 212 to adjust one or more configuration parameters for performing communications. Such configuration parameters may include any suitable type of parameters that influence the manner in which the nodes comprising the DT cluster 220 may communicate with one another or with other entities within the communication network 100. In some non-limiting and illustrative scenarios, the configuration parameters may include an adjustment of message scheduling frequency with respect to how often messages are received and/or transmitted via one or more nodes comprising the DT cluster 220. Additionally or alternatively, the change in configuration parameters may include an adjustment and/or optimization in message size in response to a congested network, moving some virtual and/or physical DTs 210, 212 (that have multiple RAT/RAN support) to a less congested RAT and/or channels, etc.

The executable instructions stored in the context and situational awareness analyzer 102.2 may facilitate, in conjunction with execution via the processing circuitry 350, the DNC 102 leveraging network context and situational awareness information to provide certain recommendations regarding message transmission. Such recommendations may be provided in the form of control signals as discussed above, which cause one of more of the primary V2X nodes 208, one or more virtual DT nodes 210, and/or or more physical DT nodes 212 to adjust one or more configuration parameters for performing communications. In a non-limiting and illustrative scenario, the configuration parameters may include those adjusted by the primary V2X node 208, one or more virtual DT nodes 210, and/or one or more physical DT nodes 212 as discussed above. Additionally or alternatively, the configuration parameters may include the adjustment to a channel, RAT, and/or frequency used by the primary V2X node 208, one or more virtual DT nodes 210, and/or one or more physical DT nodes 212 to receive subsequent subscribed DTaaS service messages or any other suitable type of communications. Additional details regarding how situational awareness information is collected and leveraged to optimize DT node operations is further discussed below.

In one non-limiting and illustrative scenario, a recommendation provided by the DNC 102 in the form of control signals may comprise sending a combined DTaaS service message to multiple users that are nearby and subscribed to similar DT services. This may be accomplished by grouping any combination of the primary V2X nodes 208 of respective DT clusters 200, individual V2X nodes 208, virtual V2X nodes 210, and/or physical V2X nodes 212 (also referred to herein simply as "nodes" or "grouped nodes") into a multicast group based upon their proximity to one another. Additionally or alternatively, the DNC 102 may form groups of nodes based on their computing and/or latency properties. This may be achieved, in one illustrative and non-limiting scenario, using key performance indicators (KPI) of any of the V2X nodes 208, virtual V2X nodes 210, and/or physical V2X nodes 212 DT nodes determine a grouping strategy. In any event, once the nodes are grouped in this manner, the DNC 102 may transmit a broadcasted DTaaS service message to the group of nodes in the DTaaS multicast group as a combined message.

The executable instructions stored in the group message handler and key management module 102.6 may facilitate, in conjunction with execution via the processing circuitry 350, the DNC 102 sending a combined group message to multiple grouped nodes using a multicast address that is selected based upon the proximity of the grouped nodes to one another. Proximity in this context may be defined in any suitable manner, such as by geographic location (i.e. the nodes being within a geographic area less than a predetermined size), having a packet latency that is less than a threshold latency, having a network hop count that is less than a threshold hop count number, occupying the same network channel, etc. In this way, the DNC 102 may create a multi-channel adaptive multicast V2X operation. Thus, in one non-limiting and illustrative scenario, a DTaaS multicast group may be identified by the DNC 102 by transmitting control signals instructing each node (such as the primary V2X nodes 208, the virtual DT nodes 210, and/or the physical DT nodes 212) across several DT clusters 220 to cause the primary V2X nodes 208, the virtual DT nodes 210, and/or the physical DT nodes 212 to adjust an operating channel to the same channel as one another and/or to utilize a different RAT, enabling these grouped nodes to receive future multicast messages. Additional details regarding the grouped message transmission procedure are provided below.

The executable instructions stored in the group message handler and key management module 102.6 may facilitate, in conjunction with execution via the processing circuitry 350, the DNC 102 sending control signals in the form of service announcement information to the primary V2X node 208 via the communication links 103. Additionally or alternatively, the DNC 102 may transmit service announcement information to the virtual and/or physical DT nodes 210, 212 via the DT front-end 304 and/or the DT back-end 308 as discussed above. The service announcement information may be transmitted in this manner on a predetermined channel and may also identify the subsequent channels/subchannel RAT, etc., such that users are aware of the channel/subchannel, RAT, etc. on which the next subscribed DTaaS service message is being received. This ensures timely reception of DTaaS service messages, especially for half-duplex nodes in the case of multi-channel and/or multi-RAT operation. Additional details regarding the multi-RAT operation are further discussed below.

VII. Optimizing DTaaS Service Based on Network Context/ Situational Awareness and Parameters Again, the DNC 102 is configured to monitor network variables, network/RAN parameters, and/or any other suitable V2X communication network properties to assess network traffic patterns, congestion, and scalability conditions. The NCSA analyzer module 102.2 enables the DNC 102 to periodically collect network context information, which may include any suitable type of data related to the state of the network or any other suitable type of information that identifies the status and/or operation of any suitable portions of the network architecture 100 within which the DNC 102 and the other various users (i.e. nodes) operate. The DNC 102 may additionally or alternatively collect situational awareness information, which is further discussed below. In any event, the network context information and the situational awareness information may be collected via commutations with the DNC agent identified with the DT nodes 210, 212 as discussed above with respect to FIG. 3A, which may be implemented via the execution of the situational awareness information collector module 308.1 via the DT back-end 308. However, this is a non-limiting and illustrative scenario, and the DNC 102 may receive the network context information and situational awareness information from any suitable source.

The network context information may comprise the aforementioned network variables, as well as any other suitable network parameters such as connectivity status with other users/vehicles (i.e. other V2X nodes 208), network congestion, etc., as well as user/vehicles (i.e. V2X nodes 208) current status information, which may indicate a user type, location, speed, direction, connectivity information such as supported RATs, currently monitoring channel(s), etc. The situational awareness information may include any suitable type of data pertaining to the environment and/or region covered by the V2X network, which may include road/intersection traffic, the detection of various traffic events such as collisions, accidents, traffic jams, etc.

In a non-limiting and illustrative scenario, the NCSA analyzer module 102.2 enables the DNC 102 to receive and process NCSA messages that are periodically transmitted via the users/vehicles (i.e. the V2X nodes 108) of the V2X communication network, as well as receive and process associated information to assist the DNC 102 in obtaining the network context information and/or the situational awareness information. Infrastructure nodes/sensors within the V2X communication network may also assist the DNC 102 in acquiring the situational awareness information. In this way, by monitoring existing V2X messages (among road-users/vehicles, roadside infrastructure, etc.) to acquire part or all the information for situational/context awareness, communication overhead of DTaaS service messages may be minimized or at least reduced.

The DNC optimization algorithms, which are executed via the optimization policy module 102.3, may dynamically respond to changes in the network based upon the collected network context information. In one non-limiting and illustrative scenario, this may include identifying an operational status of a cluster RAT/RAN used by one of the DT nodes 210, 212 such as a channel busy ratio, network congestion, etc. Again, the data interface 360 enables the DNC 102 to provide control signals to the V2X nodes 208 and/or the DT nodes 210, 212, as noted above. These control signals may thus contain information recommending a change in DTaaS service settings/configuration based on information obtained via the execution of other modules, such as the NCSA analyzer module 102.2. Additionally or alternatively, the DT back-end 308 may work alone or in conjunction with the DNC 102 to perform such optimization tasks via the execution of the optimization algorithm 308.2. Thus, the optimization policy module 102.3 and/or the optimization algorithm 308.2 may utilize any suitable type of predetermined rules to enable a dynamic adaptation to DTaaS service settings/configuration.

In this way, data with respect to the current network environment (such as congestion levels, the availability of one or multiple RATs, the availability of one or multiple channels/bands, etc.) may be used by the DNC 102 to provide recommendations via the transmission of the control signals. As noted above, these recommendations may include configuration parameters and/or settings to be adjusted with respect to the DTaaS and the network protocol stack, which may include reducing message frequency, optimizing message size in the case of detected network congestion, moving some users (with multiple RAT support) to less congested RAT and/or channels, etc. Thus, in a non-limiting and illustrative scenario, the DT nodes 110.2, 112.2 that are supported by the cluster network A via the base station 160 may be instructed to move to the cluster network B that is supported by the RAT/RAN 3 via the base station 170. Upon such DNC recommendation, the DT nodes 110.2, 112.2 may adjust their DTaaS message frequency or reducing the DTaaS message size. This reduction in message size may be achieved, in one illustrative and non-limiting scenario, by skipping one or more portions of content that are deemed less important in accordance with a predetermined set of rules, or skipping a portion of content that has not been changed beyond a threshold (in terms of a number of bits, an overall value, etc.) compared to a previously transmitted DTaaS message.

Similarly, based on network context information and the situational awareness information, the DNC 102 may provide recommendations with respect to the DTaaS via the transmission of control signals to the V2X nodes 208, the virtual DT nodes 210, and/or the physical DT nodes 212 as discussed herein. This may include one or more V2X nodes 208 transmitting, as a broadcasted DTaaS service message, a combined service message to multiple users (i.e. other V2X nodes 208, virtual DT nodes 210, and/or physical DT nodes 212) when the users are located close to one another, subscribed to similar services, and listening to same channel and using the same RAT, while skipping individual DT service messages. As another non-limiting and illustrative scenario, this may include broadcasting a DTaaS service message to multiple primary V2X nodes 208 that are located close to one another, which may additionally be directed to the DT nodes 210, 212 that are identified with (such as being clustered with) each of these primary V2X nodes 208 when the primary V2X nodes 208 are located close to one another, subscribed to similar services, and listening to same channel and using the same RATs. Again, the "closeness" of the V2X nodes 208, the virtual DT nodes 210, and/or the physical DT nodes 212 for grouping purposes as discussed herein may be determined via physical proximity, and additionally or alternatively may include other metric to determine node "closeness." In a non-limiting and illustrative scenario, the DNC 102 may determine closeness of nodes for grouping based upon performance, availability, and/or resilience properties. The DNC may additionally or alternatively form groups of nodes considering, as part of the "closeness" criteria, the function (such as a micro service) the DT nodes are configured to perform.

In other words, the control signals transmitted by the DNC 102 may cause the V2X nodes 108 to transmit a combined group message to multiple virtual and/or physical DT nodes 110, 112 using a multicast address to create a multi-channel adaptive multicast V2X operation. To provide an illustrative and non-limiting scenario, one of the V2X nodes 108 may transmit a combined message addressed to a multicast group formed by the DT cluster of the V2X node 108.2 and the respective clustered DT nodes 110.2, 112.2, as the DNC 102 has knowledge of the nodes forming the DT cluster being proximate to one another, operating on the same RAT, and being subscribed to the same DTaaS messages. In this way, each DT node within a respective DT cluster may receive the same DTaaS service messages. Moreover, if the role of a DT node is to replicate the same operations redundantly (for resilience or availability), neither the replicated nor the "original" DT node would be favored over the other. That is, network routing and congestion control logic may recognize the group messages aimed at supporting DT scenarios, and as a result optimize network QoS strategies to ensure timely delivery across the group members.

It is noted that a combined DTaaS service message may be size efficient. That is, the combined DTaaS service message may be intended for transmission to each node in a combined group of V2X nodes and DT nodes, or a message generated for multiple DT clusters by combining DT nodes of multiple such users with a common message portion (intended for all users) as well as message portion for each individual user. Thus, to provide an illustrative and non-limiting scenario, the combined message of the broadcasted DTaaS service message may comprise a common message portion for a group of primary V2X nodes 108 in a DTaaS multicast group, as well as an individual message portion for each primary V2X node 108 from among the group of primary V2X nodes. In this way, if a group member is supposed to process a function that is specific to that particular node, the individual message portion may be identified with a node-specific payload that may contain node-specific control instructions.

Furthermore, the DNC 102 comprises a group message handler and key management module 102.6, which is configured to facilitate the generation of combined messages in this manner. Moreover, the DNC agent of the DT back-end 308 also comprises a group message handler module 308.3, which comprises instructions that enables the DT nodes 210, 212 to receive and decode the contents of the combined messages as discussed herein. Thus, the group message handler and key management module 102.6 first identifies recommendations for group messaging based upon the conditions described above (i.e. proximity of users, subscribing to the same messages, using the same RAT, etc.). Next, the group message handler and key management module 102.6 coordinates with the other modules such as the NCSA analyzer module 102.2 and the resource allocations module 102.5 to handle group messaging by transmitting the appropriate control signals instructing the V2X nodes 108 with respect to the content of the combined messages and the multicast group to which the combined messages are to be transmitted.

Therefore, based on the network context and the situational awareness information, the DNC 102 optimization algorithms may recommend moving some users (which are subscribed to similar DTaaS service, are close by, and are listening to different channels) to the same channel, so that a combined DT service message can be sent more efficiently. The control signal transmitted to the various V2X nodes 108 and DT nodes 110, 112 may cause these nodes to change their configuration settings in accordance with these recommendations to continue to receive subsequent DTaaS service messages, and other relevant communications, in accordance with the updated channel.

VIII. Handling Transmission of DTaaS messages on Multiple Channels with Heterogeneous Users It is noted that service message transmission for DTaaS messages may require multiple channels, as DTaaS messages for all users may not fit in the same channel, particularly when a channel is also shared by other messages (such as another edge service message, V2X messages such as collective perception messages, VRU safety messages, etc.). In such multi-channel operation scenarios, DTaaS messages for various users may be transmitted on different channels via the execution of the instructions in the Multi-Channel/RAT operation handler module 102.8. In the case of heterogeneous user capability (i.e. users capable of supporting one or more simultaneous radio channel reception/transmission configurations at the access layer), users may be monitoring (i.e. tuned to) different channels based upon where the transmissions of messages of their interest are currently active. The multi-channel operational issues need to be handled to send a combined group message to multiple nodes that are geographically close and subscribed to the same, or related, DTaaS services. In one non-limiting and illustrative scenario, each nodes within a group may be monitoring the same channel on which a group message can be transmitted at the time of arrival of such group message.

The multi-channel/RAT operation handler module 102.8 and the group message handler module and key management module 102.6 coordinate with one another to ensure that this is the case.

Thus, the DNC 102 may recommend these users (for which a group message is transmitted, such as users that are close in proximity and subscribed to the same or related DTaaS services) to monitor a specific channel to enable group message transmission via operation of the multi-channel/RAT operation handler module 102.8. It is noted that unless otherwise stated, the term "users" or "DTaaS users" as used herein may include any one of the V2X nodes 108, such as the standalone V2X nodes 108.4, 108.5, the primary V2X nodes 108.1, 108.2, 108.3 as discussed herein with respect to the various deployment scenarios, and may also include the DT nodes 110, 112 identified with the primary V2X nodes 108.1, 108.2, 108.3 that form respective DT clusters in accordance with the various deployment scenarios as discussed above with respect to FIG. 1.

In any event, the recommendations provided via the DNC 102 may be implemented via the transmission of control signals as discussed above, and may be implemented via the DNC 102 utilizing the network context and situational awareness information as noted above to decide groups of users and the channel for group messages for these grouped users. Such recommendations may be transmitted as control signals via a predetermined channel, which in one illustrative and non-limiting scenario may include a primary DT service message channel (PDTSMC), which is described in further detail below.

In the event that the DNC 102 cannot make and/or send a recommendation to move users to a specific channel, or users are not allowed to change their radio configuration parameters at the access layer based upon the DNC recommendation, the DNC 102 may resolve this and send group messages only to users that are currently monitoring the same channel. The network context and situational awareness information is thus utilized by DNC 102 as noted above to select users for combined group messages.

The DNC 102 may utilize a similar approach to send combined group messages to multiple users in the case of heterogeneous users, i.e. in terms of supporting different RATs (one or more). The DNC 102 may either move users (for which a group message is transmitted, e.g., users which are close and subscribed to same or related DTaaS services) to the same RAT, or include only users that are currently active on the same RAT, for a combined group message. Again, the DNC 102 may utilize the network context and situational awareness information to select users for a combined group message in the event that users have heterogeneous RAT support capabilities. The DNC 102 may perform these actions via the generation and transmission of control signals, which may be supported via the multi-channel/RAT operation handler module 102.8.

In case of multi-channel operation, the users within the network architecture 100 need to know which channel/subchannel the next subscribed DTaaS service message will arrive. Thus, the DNC 102 is configured to transmit control signals including service reception information on a predetermined channel, which is determined via execution of the instructions stored in the multi-channel/RAT operation handler module 102.8. The instructions stored in the multi-channel/RAT operation handler 308.4 of the DNC agent included in the DT back-end 308 enables the DT nodes 210, 212 to execute the received instructions, i.e. to adjust configuration parameters to switch channels and/or RATs as instructed. In one non-limiting and illustrative scenario, one channel may be set as a predetermined channel, which functions as an agreed, default, or primary DT service message channel (PDTSMC). The DNC 102 coordinates with the users within the network architecture 100 to select a PDTSMC via transmitted control signals and confirmation of the responses transmitted via the users. Once the PDTSMC is established in this manner, all users in the network architecture 100 monitor at least the PDTSMC, and DT service messages are transmitted on this channel. When all DTaaS service messages for all users cannot fit on the PDTSMC, the DNC 102 may move the DTaaS service messages for some users to other channels. When messages for some users are moved to a different channel, the DNC 102 transmits, as control signals, a notification over the current PDTSMC that includes information regarding which messages are to be offloaded (i.e., which channels to receive the offloaded messages). In this way, the DNC 102 ensures that the users of the network architecture 102 are adequately informed regarding which channels to receive subsequent DTaaS service messages.

The network context and situation awareness information available at the DNC 102 may be used in conjunction with the multi-channel/RAT operation handler module 102.8 to allow the DNC 102 to determine offloading of DTaaS service messages for specific users to other channels. In one non-limiting and illustrative scenario, users capable of monitoring multiple channels simultaneously may be prioritized for offloading their messages to other channels. A similar approach may also be considered to offload some messages to different RATs when there are users capable of supporting multiple RATs. Thus, in another non-limiting and illustrative scenario, if a message for a half-duplex user is offloaded to another channel, that user may frequently monitor the PDTSMC in a time division multiplexed manner while monitoring the new channel with the offloaded message.

Again, some users may support different types of RATs, with some users supporting multiple RATs. The communication environment on these RATs (such as congestion levels) may be different depending on underlying traffic loads, the number of users, the total spectrum/bandwidth (BW) availability, etc., at a specific time instant. Thus, the DNC 102 may, in conjunction with the multi-channel/RAT operation handler module 102.8, coordinate with the DTaaS apps 104 and the network protocol stack/operations to optimize satisfying the QoS/SLA of DTaaS services and balancing congestion/load on these different RATs.

It is noted that when offloading the DT messages to different channels or RATs for different users, the DNC 102 may consider ways of maximizing channel bandwidth by combining messages. This may be achieved by moving proximately 'close' users subscribed to similar DTaaS services to the same channel and/or to the same RAT. Again, proximately close in this context may mean users that are geographically close to one another (i.e. within an area less than a predetermined size), or satisfying other conditions such as a number of hops, latency, etc. In any event, prior to offloading DT service messages to other channels, the DNC 102 may coordinate with the network protocol stack and the DTaaS apps 104 to transmit, via control signals, a predetermined number of notifications on the PDTSMC to the associated users. Additional details with respect to the use of combined messages for intended groups of users are further discussed immediately below.

IX. Sending a Combined DTaaS Message to a Group of Proximate Users:

The DNC 102 is also configured to support an adaptive multicast transmission technique to send a combined message to a group of nearby users that are 'close' to one another, and have subscribed to the same DTaaS services. Again, the term "close" in this context may, but need not, refer to physical or geographic proximity, as other conditions as noted herein may also be used to establish multicast groups in accordance with user proximity to one another. In any event, the DNC 102 may determine this information via the aforementioned collected network context and situational awareness information. Using this information, the DNC 102 may dynamically group users together to form a DTaaS multicast group. This functionality is supported via the processing circuitry 350 of the DNC 102 executing instructions identified with the group message handler module and key management module 102.6, as discussed above.

When geographic proximity is used to identify multicast groups, a "closeness" of users in the group may be defined in accordance with a threshold distance condition being satisfied. Thus, a group of users may be established by the DNC 102 from those users that are located within a threshold distance between one another or, alternatively, in a geographic area that does not exceed a threshold area, such as a circular geographic region having a threshold radial distance that contains all users within the defined group. Furthermore, the threshold values in each case may be dynamic and/or dependent upon the situational awareness information. Thus, in a non-limiting and illustrative scenario, for a congested area of users that may occur in a dense urban environment, such as a congested intersection, the threshold values may be smaller compared to the threshold values for a more rural, less congested area or users.

It is noted that different entities in the network architecture 100 may send group messages. Such entities may include the DNC 102 and/or primary V2X nodes 208. Moreover, an objective of group messaging is maintaining consistency across multiple nodes. Thus, the DNC 102 may utilize group messages to manage the settings and configurations/lifecycle of one or more V2X nodes 208, virtual DT nodes 210, and/or physical DT nodes 212. The primary V2X node 208.1 may utilize group messaging to cause the DT nodes 210, 212 to replicate the functions the primary V2X node 208.1 is performing, such that the nodes within the cluster (such as the primary node 208.1, the virtual nodes 210.1-210.N, and the physical DT nodes 212.1-212.M) may have a shared state. In this way, in the event that the primary V2X node fails, one of the other DT nodes in the cluster may then function as the primary V2X node 208.1.

To provide a non-limiting and illustrative scenario, the DNC 102.6 (via execution of instructions via the group message handler and key management module 102.6) may determine a group of nodes and a group message to be transmitted. The primary node 208.1, one of the virtual DT nodes 210.1-210.N, or one of the physical DT nodes 212.1-212.M may then generate and transmit a specific message as group message via the DT back-end 308.3 by way of execution of the instructions stored in the group message handler 308.3.

In any event, when the group messages are sent, the messages may include metadata that acts as a directory of message contents. Each item or portion of message contents in the combined group message may be tagged with a unique identifier or a group identifier. Thus, the message contents having group identifier tags may be sent in cleartext or in a form that allows access by the other group members. In contrast, the message contents tagged with the unique individual identifiers may be encrypted by the recipient's key, such that other group members are not able to access the confidential message contents.

Figure 4:
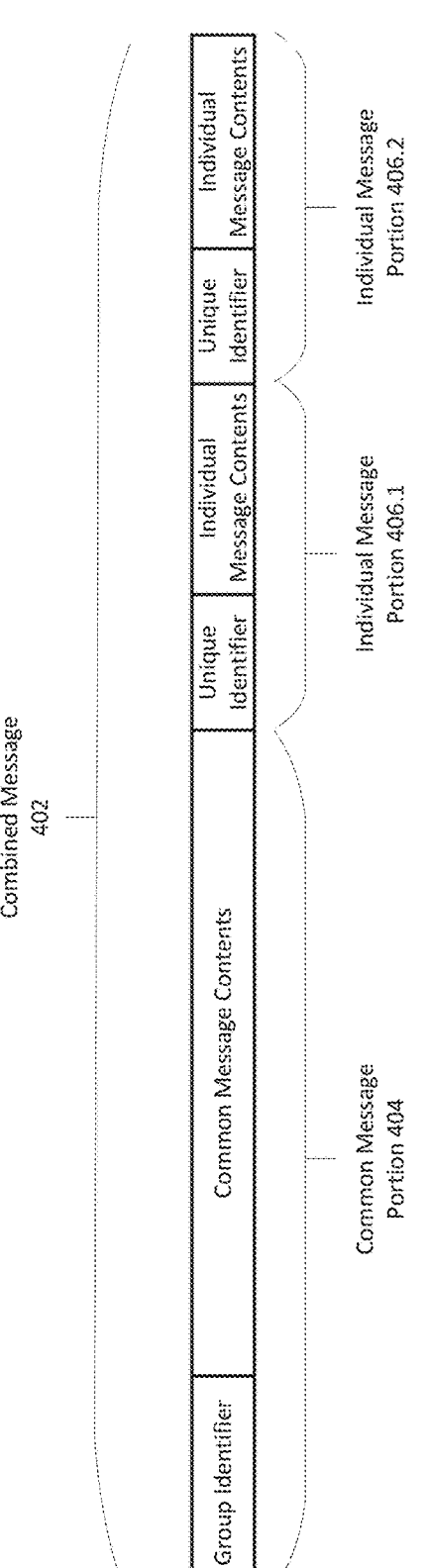
FIG. 4 illustrates a combined message format, in accordance with the disclosure.

FIG. 4 illustrates a combined message format, in accordance with the disclosure. As shown in FIG. 4, a combined message 402 is shown, which may correspond to a broadcasted DTaaS message within the network architecture 100. The broadcasted combined message may be transmitted by the DNC 102, or via the DTaaS apps 104 using network resources such as other V2X nodes 208, virtual DT nodes 210, and/or physical DT nodes 212 as noted herein. In any event, and as shown in FIG. 4, the combined message 402 comprises a common message portion 404, which is intended for all user recipients in the targeted group. The group identifier may thus tag the common message contents and comprise cleartext, which identifies each user in the group via a multicast addressing scheme. Although a multicasting addressing scheme is discussed herein, this is a non-limiting and illustrative scenario and the implementations described herein may use additional or alternative addressing schemes. Such addressing schemes may include the use of a group key, group credential, or other group identifier that is in addition to the network addressing scheme discussed herein.

In any event, the combined message 402 may also include any suitable number of individual message portions 406 with two (406.1, 406.2) being shown in FIG. 4 for purposes of brevity. Each individual message portion 406 may comprise individual message contents, which are tagged with respective unique identifiers that identify the individual user (i.e. the intended user recipient of the individual message contents). The unique identifiers may be tagged with the encryption keys identified with each recipient, such that only the recipient that has access to the matching key may decode the individual message contents. In this way, the use of multicast is particularly useful to send directory information to all group members, as well as combining multiple messages that allows each member to access only the content targeted at that specific group member.

The DNC 102 may utilize any suitable type of encryption scheme to send group messages with contents that are tagged with the unique individual identifiers. In one illustrative and non-limiting scenario, an identity based public key encryption (IBPKE) scheme may be implemented together with a key generation center (KGC) to tie each entity's identity to a tuple of public parameters. The sender (Such as the DNC 102) may then wrap and send to each receiver in the group the symmetric key for the receiver's content. It is noted that this may occur once, and afterwards the symmetric key may be reused for subsequent messages targeting a particular receiver. Periodically, previously used symmetric key(s) may be discarded and replaced by a new key. This may be achieved by wrapping the new symmetric key using a key-wrapping-key, in which case the receiver unwraps the symmetric key. As another illustrative and non-limiting scenario, an identity based public key encryption may be implemented via stable participant groups that may be formed and assigned a group-identity that is based on a public key enabling (PKE) scheme, which may be used to form a primary group-channel that is efficient yet secure. In any event, the group key storage 102.7 in the DNC 102 and the group key storage 308.5 in the DNC agent of the DT nodes 210, 212 may facilitate the generation and/or access of such keys to ensure encrypted communication of individualized message content.

FIG. 5 illustrates a process flow. With reference to FIG. 5, the process flow 500 may be executed by and/or otherwise associated with processing circuitry and/or storage devices. The processing circuitry and/or storage devices may be associated with one or more components of the DNC 102 as discussed herein. The flow 500 may include alternate or additional steps that are not shown in FIG. 5 for purposes of brevity, and may be performed in a different order than the steps shown in FIG. 5.

Flow 500 may begin by accessing (block 502) network variables specifying synchronization state requirements. These network variables may be maintained by the DT nodes 210, 212 as discussed above, and specify synchronization state requirements with respect to communications between the virtual DT nodes 210 and the physical DT nodes 212 identified with each respective DT cluster 220. Thus, such network variables may be directed to any suitable type network variable that is associated with and/or relevant to the time-based synchronization of the virtual and physical DT nodes 210, 212.

Flow 500 may include assigning (block 502) a workload processing transaction meeting the synchronization state requirements. This workload processing transaction may be assigned to a virtual or physical DT node 210, 212 via the DNC 102 or via the DTaaS apps 104, as noted above. The workload processing transaction may comprise any suitable type of processing operation in accordance with the DTaaS services, which may include any suitable type of operation relevant to the implementation of the V2X communication network, such as traffic pattern analysis for an intersection or section of highway, transactions used for the generation of DTaaS service messages, etc. The assignment of the workload processing transaction may be in the form of transmitted control signals, which may include DTaaS service messages.

FIG. 6 illustrates a process flow. With reference to FIG. 6, the process flow 600 may be executed by and/or otherwise associated with processing circuitry and/or storage devices. The processing circuitry and/or storage devices may be associated with one or more components of a virtual DT node 210 or a physical DT node 212 as discussed herein. The flow 600 may include alternate or additional steps that are not shown in FIG. 6 for purposes of brevity, and may be performed in a different order than the steps shown in FIG. 6.

Flow 600 may begin by receiving (block 602) DTaaS service messages. These DTaaS service messages may be received via the DT API interface 302 as discussed above with respect to FIG. 3A. The DTaaS service messages may include any suitable type of information that enables the virtual and physical DT nodes 210, 212 to maintain a data model of a V2X node 208.

The flow 600 may include providing (block 604) a data model of a V2X node, which may be subsequently accessed by the virtual and/or physical DT nodes 210, 212. Thus, the data model may include network variables and other network context information that may be obtained by querying the data model, with such queries being in the form of subsequent DTaaS messages.

The flow 600 may include transmitting (block 606) network context information and/or situational awareness information to a DNC, such as the DNC 102 as discussed herein. Again, the network context information may comprise the network variables obtained via querying of the data model. The network context information and/or situational awareness information may additionally or alternatively include any other suitable type of information as discussed above, which may be collected via the virtual and/or physical DT node 210, 212 via execution of the context and situational awareness information collector module 308.1.

The flow 600 may include receiving (block 608) instructions from the DNC with respect to the virtual and/or physical DT node 210, 212 performing communication operations. This may include the DNC transmitting one or more control signals, which are received via the DNC agent of the virtual and/or physical DT node 210, 212 as discussed herein. The instructions may result in an adjustment of configuration parameters with respect to a use of a radio access technology (RAT), a channel used for performing communications, a message size, etc., as noted above.

General Operation of a Digital Twin Network Controller (DNC)

A digital twin (DT) network controller (DNC) is provided. The DNC is configured to manage virtual DT nodes and physical DT nodes that form part of respective DT clusters. The DNC comprises a memory configured to store instructions, and processing circuitry configured to execute instructions stored in the memory to: access, via one of the respective DT clusters, network variables specifying synchronization state requirements with respect to communications between the physical DT nodes and the virtual DT nodes identified with the respective DT cluster; and assign, to a physical DT node or a virtual DT node identified with the one of the respective DT clusters, a workload processing transaction that meets the synchronization state requirements specified by the network variables. A number of the virtual DT nodes are different than a number of physical DT nodes within the one of the respective DT clusters. Furthermore, the virtual DT nodes and the physical DT nodes that form part of the one of the respective DT clusters are part of a vehicle-to-everything (V2X) communication network. In addition or in alternative to and in any combination with the optional features previously explained in this paragraph, the workload processing transaction is transmitted as part of a broadcasted DTaaS service message in accordance with a V2X communication protocol. In addition or in alternative to and in any combination with the optional features previously explained in this paragraph, each one of the respective DT clusters is identified with a respective vehicle-to-everything (V2X) node, and the processing circuitry is further configured to execute the instructions stored in the memory to cause the DNC to: group V2X nodes of the respective DT clusters that are within a geographic area that is smaller than a predetermined size into a multicast group; and transmit a broadcasted DTaaS service message to the group of V2X nodes in the DTaaS multicast group as a combined message. In addition or in alternative to and in any combination with the optional features previously explained in this paragraph, the processing circuitry is further configured to execute the instructions stored in the memory to cause the DNC to group the V2X nodes in the DTaaS multicast group by transmitting control signals instructing each respective V2X node to adjust an operating channel to the same channel as one another. In addition or in alternative to and in any combination with the optional features previously explained in this paragraph, the processing circuitry is further configured to execute the instructions stored in the memory to cause the DNC to transmit control signals that cause a first one of the virtual DT nodes in the one of the respective DT clusters to perform a first network-related task with respect to a processing transaction, and cause a second one of the virtual DT nodes in the one of the respective DT clusters to perform a second network-related task with respect to the processing transaction. In addition or in alternative to and in any combination with the optional features previously explained in this paragraph, the processing circuitry is further configured to execute the instructions stored in the memory to transmit control signals that cause the physical DT node and/or the virtual DT node identified with the one of the respective DT clusters to adjust configuration parameters with respect to a use of a radio access technology (RAT) and/or a channel used for performing communications. In addition or in alternative to and in any combination with the optional features previously explained in this paragraph, the DNC is further configured to receive situational awareness information from a vehicle-to-everything (V2X) node identified with the one of the respective DT clusters, and the processing circuitry is further configured to execute the instructions stored in the memory to cause the DNC to transmit control signals that cause the V2X node to adjust configuration parameters for performing communications based upon the situational awareness information. In addition or in alternative to and in any combination with the optional features previously explained in this paragraph, the configuration parameters comprise a channel used by the V2X node to receive subsequent DTaaS service messages. In addition or in alternative to and in any combination with the optional features previously explained in this paragraph, the processing circuitry is further configured to execute the instructions stored in the memory to cause a transmission of a combined group message to multiple vehicle-to-everything (V2X) nodes using a multicast address to create a multi-channel adaptive multicast V2X operation, each one of the multiple V2X nodes being identified with a respective one of the DT clusters. In addition or in alternative to and in any combination with the optional features previously explained in this paragraph, the processing circuitry is further configured to execute the instructions stored in the memory to monitor network parameters, and to transmit control signals that cause one of the V2X node, the physical DT node, and/or the virtual DT node identified with the one of the respective DT clusters to adjust configuration parameters for performing communications based upon the monitored network parameters. In addition or in alternative to and in any combination with the optional features previously explained in this paragraph, the configuration parameters that are adjusted by the V2X node comprise adjusting a message scheduling frequency and/or a message size. In addition or in alternative to and in any combination with the optional features previously explained in this paragraph, the processing circuitry is further configured to execute the instructions stored in the memory to transmit service announcement information to one of the V2X node, the physical DT node, and/or the virtual DT node identified with the one of the respective DT clusters, the service announcement information identifying a channel on which subsequent subscribed DTaaS service messages will be transmitted. In addition or in alternative to and in any combination with the optional features previously explained in this paragraph, the combined message comprises a common message portion for the group of V2X nodes in the DTaaS multicast group and an individual message portion for each V2X node from among the group of V2X nodes. In addition or in alternative to and in any combination with the optional features previously explained in this paragraph, the contents of the common message portion is transmitted in cleartext and tagged with a group identifier, and contents of the individual message portion is encrypted by a recipient key and tagged with a unique identifier.

General Operation of a Digital Twin Node

A digital twin (DT) node is provided. The DT node represents a digital twin of a vehicle-to-everything (V2X) node within a V2X communication network. The DT node comprises: a DT application programming interface (DT-API) configured to receive digital twin as a service (DTaaS) service messages; a DT simulator configured to provide a data model of the V2X node that is accessed in response to requests received via the DTaaS service messages; and a digital twin (DT) network controller (DNC) agent configured to transmit network context information to a DNC that includes operational information with respect to a network operation of the V2X communication network, and to receive instructions from the DNC with respect to communication operations, the DT node is from among a plurality of DT nodes within a DT cluster, and each DT node within the DT cluster receives the same DTaaS service messages. Furthermore, the DT simulator is configured to operate in a simulation mode to execute simulations and to perform model queries in response to requests received via the DT-API, actions performed in the simulation mode do not affect production mode content and state. In addition or in alternative to and in any combination with the optional features previously explained in this paragraph, the DT simulator is configured to maintain a set of network variables that feed the DT data model, and wherein the network variables specify synchronization state requirements with respect to communications between the virtual DT node and physical DT nodes. In addition or in alternative to and in any combination with the optional features previously explained in this paragraph, the DT node further comprises a DT backend configured to collect the network context information. In addition or in alternative to and in any combination with the optional features previously explained in this paragraph, the DNC agent is configured to adjust configuration parameters for performing communication operations based upon the instructions received from the DNC.

REFERENCES

The following references are cited throughout this disclosure as applicable to provide additional clarity, particularly with regards to terminology. These citations are made by way of example and ease of explanation and not by way of limitation.

Citations to the following references are made throughout the application using a matching bracketed number, e.g., [1].

[1] https://www.willowinc.com (Willow is a digital twin services company).
[2] Providentia++: https://innovation-mobility.com/en/project-providential

APPENDIX

Overview of Digital Twin Requirements and Tradeoffs:

DTaaS solutions should maintain consistency between primary and secondary twins. Different workloads, operations, and functions have different safety, availability, resiliency, communication (reliability/latency), and security requirements. The secondary twin(s) should have compatible (safety, availability, resiliency, reliability/latency, and security) requirements so that the secondary twin(s) do not, in some way, weaken the primary twin. In some cases, having similar but distinct primary and secondary twin instances is the most effective way to achieve necessary consistency. This approach to DT design provides automatic isolation across different services deployed with DT capabilities. For example, existing frameworks such as Providentia++ [2] envision providing individually customized service messages (e.g., individual digital twins around a subscriber/road-user as a service—aka DTaaS).

DTaaS Solutions are Highly Adapted to Tenant-Specific Content and Behavior Resulting in Increased Potential for Breakdown of Tenant Isolation.

A DTaaS SP may maintain a singleton DT, however, it may provide customized DT services or may have exposed SP interfaces to subscribers that can be virtual and can be distinct DTs to each subscriber. For example, there may be an infrastructure monitoring node with a DT for traffic pattern analysis for an intersection or section of highway. The monitoring node may maintain a singleton twin for the associated road/highway segment. Vehicles may subscribe to get the DT service that complements their perception from the vehicle's own sensor technology. Such DT service messages may include information/image of traffic, lane change recommendations, accidents/dangerous-situation warnings, VRU collision warnings, etc. Although many vehicles are subscribed to the same DT service, when a provider sends DT service messages, it may include different content/information and apply various SLAs customized for each vehicle based on the vehicle's location, subscription type, vehicle type, etc. The vehicle-specific perspective can be virtualized and individualized to the DT even though the DT is derived from a common DT profile maintained by the SP. The primary DT maintains tight synchronization with the derived virtual secondary DTs so that information across virtual DTs remains consistent and changes observed by the primary DT are reflected in the virtual instances in a timely manner.

DTaaS Solutions May Create a Significant Communication/ Network Load.

DTaaS messages may also require high reliability and/or low latency in some cases. Moreover, DTaaS services may be dominant in network congested areas such as at busy intersections, urban areas, or during emergencies where network traffic is already high. Communication-side optimization is crucial to reduce communication overhead while meeting necessary reliability and latency requirements for DTaaS service messages. A combined group message can thus be transmitted to multiple nodes that are geographically close and subscribed to the same, or related DTaaS services—to reduce communication overhead. Moreover, efficient handling of transmission of DTaaS messages is necessary on Multiple Channels with Heterogeneous Users. Service message transmission for DTaaS messages may require multiple channels as DTaaS service messages for all users may not fit in the same channel. In such multi-channel operation cases, DTaaS messages for various users may be transmitted on different channels. In case of heterogeneous user capability (users capable of supporting one or more simultaneous radio channel reception/transmission configurations at access layer), users may be monitoring (tuned to) different channel(s) based on where transmissions of messages of their interest are currently active. The multi-channel operational issues need to be handled to send individual or a combined group message to multiple nodes. Network context and situational awareness is crucial to optimize transmission of DTaaS service messages in a communication efficient manner.

EXAMPLES

The following examples pertain to various techniques of the present disclosure.

An example (e.g. example 1) is directed to a digital twin (DT) network controller (DNC). The DNC is configured to manage virtual DT nodes and physical DT nodes that form part of respective DT clusters, and comprises: a memory configured to store instructions; and processing circuitry configured to execute instructions stored in the memory to: access, via one of the respective DT clusters, network variables specifying synchronization state requirements with respect to communications between the physical DT nodes and the virtual DT nodes identified with the respective DT cluster; and assign, to a physical DT node or a virtual DT node identified with the one of the respective DT clusters, a workload processing transaction that meets the synchronization state requirements specified by the network variables, wherein a number of the virtual DT nodes are different than a number of physical DT nodes within the one of the respective DT clusters.

Another example (e.g. example 2) relates to a previously-described example (e.g. example 1), wherein the virtual DT nodes and the physical DT nodes that form part of the one of the respective DT clusters are part of a vehicle-to-everything (V2X) communication network.

Another example (e.g. example 3) relates to a previously-described example (e.g. one or more of examples 1-2), wherein the workload processing transaction is transmitted as part of a broadcasted DTaaS service message in accordance with a V2X communication protocol.

Another example (e.g. example 4) relates to a previously-described example (e.g. one or more of examples 1-3), wherein each one of the respective DT clusters is identified with a respective vehicle-to-everything (V2X) node, and wherein the processing circuitry is further configured to execute the instructions stored in the memory to cause the DNC to: group V2X nodes of the respective DT clusters that are within a geographic area that is smaller than a predetermined size into a multicast group; and transmit a broadcasted DTaaS service message to the group of V2X nodes in the DTaaS multicast group as a combined message.

Another example (e.g. example 5) relates to a previously-described example (e.g. one or more of examples 1-4), wherein the processing circuitry is further configured to execute the instructions stored in the memory to cause the DNC to group the V2X nodes in the DTaaS multicast group by transmitting control signals instructing each respective V2X node to adjust an operating channel to the same channel as one another.

Another example (e.g. example 6) relates to a previously-described example (e.g. one or more of examples 1-5), wherein the processing circuitry is further configured to execute the instructions stored in the memory to cause the DNC to transmit control signals that cause a first one of the virtual DT nodes in the one of the respective DT clusters to perform a first network-related task with respect to a processing transaction, and cause a second one of the virtual DT nodes in the one of the respective DT clusters to perform a second network-related task with respect to the processing transaction.

Another example (e.g. example 7) relates to a previously-described example (e.g. one or more of examples 1-6), wherein the processing circuitry is further configured to execute the instructions stored in the memory to transmit control signals that cause the physical DT node and/or the virtual DT node identified with the one of the respective DT clusters to adjust configuration parameters with respect to a use of a radio access technology (RAT) and/or a channel used for performing communications.

Another example (e.g. example 8) relates to a previously-described example (e.g. one or more of examples 1-7), wherein the DNC is further configured to receive situational awareness information from a vehicle-to-everything (V2X) node identified with the one of the respective DT clusters, and wherein the processing circuitry is further configured to execute the instructions stored in the memory to cause the DNC to transmit control signals that cause the V2X node to adjust configuration parameters for performing communications based upon the situational awareness information.

Another example (e.g. example 9) relates to a previously-described example (e.g. one or more of examples 1-8), wherein the configuration parameters comprise a channel used by the V2X node to receive subsequent DTaaS service messages.

Another example (e.g. example 10) relates to a previously-described example (e.g. one or more of examples 1-9), wherein the processing circuitry is further configured to execute the instructions stored in the memory to cause a transmission of a combined group message to multiple vehicle-to-everything (V2X) nodes using a multicast address to create a multi-channel adaptive multicast V2X operation, each one of the multiple V2X nodes being identified with a respective one of the DT clusters.

Another example (e.g. example 11) relates to a previously-described example (e.g. one or more of examples 1-10), wherein the processing circuitry is further configured to execute the instructions stored in the memory to monitor network parameters, and to transmit control signals that cause one of the V2X node, the physical DT node, and/or the virtual DT node identified with the one of the respective DT clusters to adjust configuration parameters for performing communications based upon the monitored network parameters.

Another example (e.g. example 12) relates to a previously-described example (e.g. one or more of examples 1-11), wherein the configuration parameters that are adjusted by the V2X node comprise adjusting a message scheduling frequency and/or a message size.

Another example (e.g. example 13) relates to a previously-described example (e.g. one or more of examples 1-12), wherein the processing circuitry is further configured to execute the instructions stored in the memory to transmit service announcement information to one of the V2X node, the physical DT node, and/or the virtual DT node identified with the one of the respective DT clusters, the service announcement information identifying a channel on which subsequent subscribed DTaaS service messages will be transmitted.

Another example (e.g. example 14) relates to a previously-described example (e.g. one or more of examples 1-13), wherein the combined message comprises a common message portion for the group of V2X nodes in the DTaaS multicast group and an individual message portion for each V2X node from among the group of V2X nodes.

Another example (e.g. example 15) relates to a previously-described example (e.g. one or more of examples 1-14), wherein contents of the common message portion is transmitted in cleartext and tagged with a group identifier, and wherein contents of the individual message portion is encrypted by a recipient key and tagged with a unique identifier.

An example (e.g. example 16) relates to a digital twin (DT) node representing a digital twin of a vehicle-to-everything (V2X) node within a V2X communication network. The DT node comprises: a DT application programming interface (DT-API) configured to receive digital twin as a service (DTaaS) service messages; a DT simulator configured to provide a data model of the V2X node that is accessed in response to requests received via the DTaaS service messages; and a digital twin (DT) network controller (DNC) agent configured to transmit network context information to a DNC that includes operational information with respect to a network operation of the V2X communication network, and to receive instructions from the DNC with respect to communication operations, wherein the DT node is from among a plurality of DT nodes within a DT cluster, and wherein each DT node within the DT cluster receives the same DTaaS service messages.

Another example (e.g. example 17) relates to a previously-described example (e.g. example 16), wherein the DT simulator is configured to operate in a simulation mode to execute simulations and to perform model queries in response to requests received via the DT-API, wherein actions performed in the simulation mode do not affect production mode content and state.

Another example (e.g. example 18) relates to a previously-described example (e.g. one or more of examples 16-17), wherein the DT simulator is configured to maintain a set of network variables that feed the DT data model, and wherein the network variables specify synchronization state requirements with respect to communications between the virtual DT node and physical DT nodes.

Another example (e.g. example 19) relates to a previously-described example (e.g. one or more of examples 16-18), further comprising: a DT backend configured to collect the network context information.

Another example (e.g. example 20) relates to a previously-described example (e.g. one or more of examples 16-19), wherein the DNC agent is configured to adjust configuration parameters for performing communication operations based upon the instructions received from the DNC.

An example (e.g. example 21) is directed to a digital twin (DT) network controller (DNC). The DNC is configured to manage virtual DT nodes and physical DT nodes that form part of respective DT clusters, and comprises: a memory configured to store instructions; and processing means for executing instructions stored in the memory to: access, via one of the respective DT clusters, network variables specifying synchronization state requirements with respect to communications between the physical DT nodes and the virtual DT nodes identified with the respective DT cluster; and assign, to a physical DT node or a virtual DT node identified with the one of the respective DT clusters, a workload processing transaction that meets the synchronization state requirements specified by the network variables, wherein a number of the virtual DT nodes are different than a number of physical DT nodes within the one of the respective DT clusters.

Another example (e.g. example 22) relates to a previously-described example (e.g. example 21), wherein the virtual DT nodes and the physical DT nodes that form part of the one of the respective DT clusters are part of a vehicle-to-everything (V2X) communication network.

Another example (e.g. example 23) relates to a previously-described example (e.g. one or more of examples 21-22), wherein the workload processing transaction is transmitted as part of a broadcasted DTaaS service message in accordance with a V2X communication protocol.

Another example (e.g. example 24) relates to a previously-described example (e.g. one or more of examples 21-23), wherein each one of the respective DT clusters is identified with a respective vehicle-to-everything (V2X)

node, and wherein the processing means executes the instructions stored in the memory to cause the DNC to: group V2X nodes of the respective DT clusters that are within a geographic area that is smaller than a predetermined size into a multicast group; and transmit a broadcasted DTaaS service message to the group of V2X nodes in the DTaaS multicast group as a combined message.

Another example (e.g. example 25) relates to a previously-described example (e.g. one or more of examples 21-24), wherein the processing means executes the instructions stored in the memory to cause the DNC to group the V2X nodes in the DTaaS multicast group by transmitting control signals instructing each respective V2X node to adjust an operating channel to the same channel as one another.

Another example (e.g. example 26) relates to a previously-described example (e.g. one or more of examples 21-25), wherein the processing means executes the instructions stored in the memory to cause the DNC to transmit control signals that cause a first one of the virtual DT nodes in the one of the respective DT clusters to perform a first network-related task with respect to a processing transaction, and cause a second one of the virtual DT nodes in the one of the respective DT clusters to perform a second network-related task with respect to the processing transaction.

Another example (e.g. example 27) relates to a previously-described example (e.g. one or more of examples 21-26), wherein the processing means executes the instructions stored in the memory to transmit control signals that cause the physical DT node and/or the virtual DT node identified with the one of the respective DT clusters to adjust configuration parameters with respect to a use of a radio access technology (RAT) and/or a channel used for performing communications.

Another example (e.g. example 28) relates to a previously-described example (e.g. one or more of examples 21-27), wherein the DNC is further configured to receive situational awareness information from a vehicle-to-everything (V2X) node identified with the one of the respective DT clusters, and wherein the processing means executes the instructions stored in the memory to cause the DNC to transmit control signals that cause the V2X node to adjust configuration parameters for performing communications based upon the situational awareness information.

Another example (e.g. example 29) relates to a previously-described example (e.g. one or more of examples 21-28), wherein the configuration parameters comprise a channel used by the V2X node to receive subsequent DTaaS service messages.

Another example (e.g. example 30) relates to a previously-described example (e.g. one or more of examples 21-29), wherein the processing means executes the instructions stored in the memory to cause a transmission of a combined group message to multiple vehicle-to-everything (V2X) nodes using a multicast address to create a multi-channel adaptive multicast V2X operation, each one of the multiple V2X nodes being identified with a respective one of the DT clusters.

Another example (e.g. example 31) relates to a previously-described example (e.g. one or more of examples 21-30), wherein the processing means executes the instructions stored in the memory to monitor network parameters, and to transmit control signals that cause one of the V2X node, the physical DT node, and/or the virtual DT node identified with the one of the respective DT clusters to adjust configuration parameters for performing communications based upon the monitored network parameters.

Another example (e.g. example 32) relates to a previously-described example (e.g. one or more of examples 21-31), wherein the configuration parameters that are adjusted by the V2X node comprise adjusting a message scheduling frequency and/or a message size.

Another example (e.g. example 33) relates to a previously-described example (e.g. one or more of examples 21-32), wherein the processing means executes the instructions stored in the memory to transmit service announcement information to one of the V2X node, the physical DT node, and/or the virtual DT node identified with the one of the respective DT clusters, the service announcement information identifying a channel on which subsequent subscribed DTaaS service messages will be transmitted.

Another example (e.g. example 34) relates to a previously-described example (e.g. one or more of examples 21-33), wherein the combined message comprises a common message portion for the group of V2X nodes in the DTaaS multicast group and an individual message portion for each V2X node from among the group of V2X nodes.

Another example (e.g. example 35) relates to a previously-described example (e.g. one or more of examples 21-34), wherein contents of the common message portion is transmitted in cleartext and tagged with a group identifier, and wherein contents of the individual message portion is encrypted by a recipient key and tagged with a unique identifier.

An example (e.g. example 36) relates to a digital twin (DT) node representing a digital twin of a vehicle-to-everything (V2X) node within a V2X communication network. The DT node comprises: a DT application programming interface (DT-API) means for receiving digital twin as a service (DTaaS) service messages; a DT simulator means for providing a data model of the V2X node that is accessed in response to requests received via the DTaaS service messages; and a digital twin (DT) network controller (DNC) agent means for transmitting network context information to a DNC means that includes operational information with respect to a network operation of the V2X communication network, and to receive instructions from the DNC means with respect to communication operations, wherein the DT node is from among a plurality of DT nodes within a DT cluster, and wherein each DT node within the DT cluster receives the same DTaaS service messages.

Another example (e.g. example 37) relates to a previously-described example (e.g. example 36), wherein the DT simulator means operates in a simulation mode to execute simulations and to perform model queries in response to requests received via the DT-API means, wherein actions performed in the simulation mode do not affect production mode content and state.

Another example (e.g. example 38) relates to a previously-described example (e.g. one or more of examples 36-37), wherein the DT simulator means maintains a set of network variables that feed the DT data model, and wherein the network variables specify synchronization state requirements with respect to communications between the virtual DT node and physical DT nodes.

Another example (e.g. example 39) relates to a previously-described example (e.g. one or more of examples 36-38), further comprising: a DT backend configured to collect the network context information.

Another example (e.g. example 40) relates to a previously-described example (e.g. one or more of examples 36-39), wherein the DNC agent means adjusts configuration parameters for performing communication operations based upon the instructions received from the DNC means.

An apparatus as shown and described.

A method as shown and described.

CONCLUSION

The aforementioned description will so fully reveal the general nature of the disclosure that others can, by applying knowledge within the skill of the art, readily modify and/or adapt for various applications without undue experimentation, and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one implementation," "an implementation," "an exemplary implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The implementations described herein are provided for illustrative purposes, and are not limiting. Other implementations are possible, and modifications may be made to the described implementations. Therefore, the specification is not meant to limit the disclosure. Rather, the scope of the disclosure is defined only in accordance with the following claims and their equivalents.

The implementations described herein may be facilitated in hardware (e.g., circuits), firmware, software, or any combination thereof. Implementations may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to implementations described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the implementations described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A digital twin (DT) network controller (DNC) configured to manage virtual DT nodes and physical DT nodes that form part of respective DT clusters, the DNC comprising:

a memory configured to store instructions; and processing circuitry configured to execute instructions stored in the memory to:

access, via one of the respective DT clusters, network variables specifying synchronization state requirements with respect to communications between the physical DT nodes and the virtual DT nodes identified with the respective DT cluster; and assign, to a physical DT node or a virtual DT node identified with the one of the respective DT clusters, a workload processing transaction that meets the synchronization state requirements specified by the network variables, wherein a number of the virtual DT nodes are different than a number of physical DT nodes within the one of the respective DT clusters.

2. The DNC of claim 1, wherein the virtual DT nodes and the physical DT nodes that form part of the one of the respective DT clusters are part of a vehicle-to-everything (V2X) communication network.

3. The DNC of claim 2, wherein the workload processing transaction is transmitted as part of a broadcasted DTaaS service message in accordance with a V2X communication protocol.

4. The DNC of claim 1, wherein each one of the respective DT clusters is identified with a respective vehicle-to-everything (V2X) node, and wherein the processing circuitry is further configured to execute the instructions stored in the memory to cause the DNC to:

group V2X nodes of the respective DT clusters that are within a geographic area that is smaller than a predetermined size into a multicast group; and transmit a broadcasted DTaaS service message to the group of V2X nodes in the DTaaS multicast group as a combined message.

5. The DNC of claim 4, wherein the processing circuitry is further configured to execute the instructions stored in the memory to cause the DNC to group the V2X nodes in the DTaaS multicast group by transmitting control signals instructing each respective V2X node to adjust an operating channel to the same channel as one another.

6. The DNC of claim 1, wherein the processing circuitry is further configured to execute the instructions stored in the memory to cause the DNC to transmit control signals that cause a first one of the virtual DT nodes in the one of the respective DT clusters to perform a first network-related task with respect to a processing transaction, and cause a second one of the virtual DT nodes in the one of the respective DT clusters to perform a second network-related task with respect to the processing transaction.

7. The DNC of claim 1, wherein the processing circuitry is further configured to execute the instructions stored in the memory to transmit control signals that cause the physical DT node and/or the virtual DT node identified with the one of the respective DT clusters to adjust configuration parameters with respect to a use of a radio access technology (RAT) and/or a channel used for performing communications.

8. The DNC of claim 1, wherein the DNC is further configured to receive situational awareness information from a vehicle-to-everything (V2X) node identified with the one of the respective DT clusters, and wherein the processing circuitry is further configured to execute the instructions stored in the memory to cause the DNC to transmit control signals that cause the V2X node to adjust configuration parameters for performing communications based upon the situational awareness information.

9. The DNC of claim 8, wherein the configuration parameters comprise a channel used by the V2X node to receive subsequent DTaaS service messages.

10. The DNC of claim 1, wherein the processing circuitry is further configured to execute the instructions stored in the memory to cause a transmission of a combined group message to multiple vehicle-to-everything (V2X) nodes using a multicast address to create a multi-channel adaptive multicast V2X operation, each one of the multiple V2X nodes being identified with a respective one of the DT clusters.

11. The DNC of claim 1, wherein the processing circuitry is further configured to execute the instructions stored in the memory to monitor network parameters, and to transmit control signals that cause one of the V2X node, the physical DT node, and/or the virtual DT node identified with the one of the respective DT clusters to adjust configuration parameters for performing communications based upon the monitored network parameters.

12. The DNC of claim 11, wherein the configuration parameters that are adjusted by the V2X node comprise adjusting a message scheduling frequency and/or a message size.

13. The DNC of claim 1, wherein the processing circuitry is further configured to execute the instructions stored in the memory to transmit service announcement information to one of the V2X node, the physical DT node, and/or the virtual DT node identified with the one of the respective DT clusters, the service announcement information identifying a channel on which subsequent subscribed DTaaS service messages will be transmitted.

14. The DNC of claim 4, wherein the combined message comprises a common message portion for the group of V2X nodes in the DTaaS multicast group and an individual message portion for each V2X node from among the group of V2X nodes.

15. The DNC of claim 14, wherein contents of the common message portion is transmitted in cleartext and tagged with a group identifier, and wherein contents of the individual message portion is encrypted by a recipient key and tagged with a unique identifier.

16. A digital twin (DT) node representing a digital twin of a vehicle-to-everything (V2X) node within a V2X communication network, the DT node comprising:

a DT application programming interface (DT-API) configured to receive digital twin as a service (DTaaS) service messages;

a DT simulator configured to provide a data model of the V2X node that is accessed in response to requests received via the DTaaS service messages; and a digital twin (DT) network controller (DNC) agent configured to transmit network context information to a DNC that includes operational information with respect to a network operation of the V2X communication network, and to receive instructions from the DNC with respect to communication operations, wherein the DT node is from among a plurality of DT nodes within a DT cluster, and wherein each DT node within the DT cluster receives the same DTaaS service messages.

17. The DT node of claim 16, wherein the DT simulator is configured to operate in a simulation mode to execute simulations and to perform model queries in response to requests received via the DT-API, wherein actions performed in the simulation mode do not affect production mode content and state.

18. The DT node of claim 16, wherein the DT simulator is configured to maintain a set of network variables that feed the DT data model, and wherein the network variables specify synchronization state requirements with respect to communications between the virtual DT node and physical DT nodes.

19. The DT node of claim 16, further comprising:

a DT backend configured to collect the network context information.

20. The DT node of claim 16, wherein the DNC agent is configured to adjust configuration parameters for performing communication operations based upon the instructions received from the DNC.

* * * * *